US010755395B2

(12) United States Patent
Yu et al.

(10) Patent No.: US 10,755,395 B2
(45) Date of Patent: Aug. 25, 2020

(54) DYNAMIC IMAGE DENOISING USING A SPARSE REPRESENTATION

(71) Applicant: CANON MEDICAL SYSTEMS CORPORATION, Otawara-shi (JP)

(72) Inventors: Zhou Yu, Wilmette, IL (US); Qiulin Tang, Buffalo Grove, IL (US); Satoru Nakanishi, Utsunomiya (JP); Wenli Wang, Briarcliff Manor, NY (US)

(73) Assignee: CANON MEDICAL SYSTEMS CORPORATION, Otawara-shi (JP)

( * ) Notice: Subject to any disclaimer, the term of this patent is extended or adjusted under 35 U.S.C. 154(b) by 449 days.

(21) Appl. No.: 14/953,221

(22) Filed: Nov. 27, 2015

(65) Prior Publication Data

US 2017/0154413 A1    Jun. 1, 2017

(51) Int. Cl.
*G06K 9/00* (2006.01)
*G06T 5/50* (2006.01)
(Continued)

(52) U.S. Cl.
CPC .............. *G06T 5/50* (2013.01); *G06K 9/3233* (2013.01); *G06K 9/40* (2013.01); *G06K 9/6223* (2013.01); *G06K 9/6247* (2013.01); *G06K 9/6249* (2013.01); *G06T 5/002* (2013.01); *G06T 5/10* (2013.01); *G06K 2009/4695* (2013.01); *G06T 2207/10081* (2013.01); *G06T 2207/10104* (2013.01); *G06T 2207/10116* (2013.01);
(Continued)

(58) Field of Classification Search
None
See application file for complete search history.

(56) References Cited

U.S. PATENT DOCUMENTS 9,460,485 B2 * 10/2016 Thibault .............. G01N 23/046
2002/0126892 A1 * 9/2002 Gindele ............... G06T 3/4007
382/166

(Continued)

OTHER PUBLICATIONS

Liu, Xin, et al. "Quantitative evaluation of noise reduction algorithms for very low dose renal CT perfusion imaging." Medical Imaging 2009: Physics of Medical Imaging. vol. 7258. International Society for Optics and Photonics, 2009. (Year: 2009).*

*Primary Examiner* — Sean M Conner
(74) *Attorney, Agent, or Firm* — Oblon, McClelland, Maier & Neustadt, L.L.P.

(57) ABSTRACT

An apparatus and method of denoising a dynamic image is provided. The dynamic image can represent a time-series of snapshot images. The dynamic image is transformed, using a sparsifying transformation, into an aggregate image and a series of transform-domain images. The transform-domain images represent kinetic information of the dynamic images (i.e., differences between the snapshots), and the aggregate image represents static information (i.e., features and structure common among the snapshots). The transform-domain images, which can be approximated using a sparse approximation method, are denoised. The denoised transform-domain images are recombined with the aggregate image using an inverse sparsifying transformation to generate a denoised dynamic image. The transform-domain images can be denoised using at least one of a principal component analysis method and a K-SVD method.

19 Claims, 23 Drawing Sheets

(51) Int. Cl.
*G06K 9/32* (2006.01)
*G06K 9/40* (2006.01)
*G06K 9/62* (2006.01)
*G06T 5/00* (2006.01)
*G06T 5/10* (2006.01)
*G06K 9/46* (2006.01)

(52) U.S. Cl.
CPC ............. *G06T 2207/20081* (2013.01); *G06T 2207/20182* (2013.01); *G06T 2207/20216* (2013.01); *G06T 2207/20221* (2013.01); *G06T 2207/30048* (2013.01)

(56) References Cited

U.S. PATENT DOCUMENTS

| | | | |
|---|---|---|---|
| 2003/0227539 A1* | 12/2003 | Bonnery | H04N 19/147 348/14.1 |
| 2008/0170623 A1* | 7/2008 | Aharon | H04N 19/97 375/240.22 |
| 2009/0297059 A1* | 12/2009 | Lee | G06K 9/40 382/275 |
| 2011/0200272 A1* | 8/2011 | Ludwig | G02B 27/46 382/280 |
| 2013/0148786 A1* | 6/2013 | Kruschel | G06K 9/40 378/62 |
| 2014/0079333 A1* | 3/2014 | Hirai | H04N 5/23235 382/255 |
| 2015/0262341 A1* | 9/2015 | Nash | H04N 5/23229 348/208.6 |

* cited by examiner

DYNAMIC IMAGE DENOISING USING A SPARSE REPRESENTATION

FIELD

This disclosure relates to denoising of dynamic image data, and more particularly to separating the dynamic image data into an aggregate image representing common features among snapshots of the dynamic image and transform-domain images representing differences between snapshots of the dynamic image data, and performing denoising on the transform-domain images before recombining the aggregate image with the transform-domain images to generate a denoised dynamic image.

BACKGROUND

The background description provided herein is for the purpose of generally presenting the context of the disclosure. Work of the presently named inventors, to the extent the work is described in this background section, as well as aspects of the description that may not otherwise qualify as conventional art at the time of filing, are neither expressly nor impliedly admitted as conventional art against the present disclosure.

Recent developments in medical imaging include medical imaging modalities to to provide wider coverage, faster scan speed, improved spatial and temporal resolution, and reduced radiation dose. These developments not only provide better patient care, but also can potentially enable new scanning techniques and clinical applications. One trend across many modalities is the development of dynamic imaging techniques. In dynamic imaging, the patients are scanned at different points in time. A volume image (e.g., a three-dimensional snapshot) corresponding to each instant of time along a time series is then reconstructed. Functional information relevant to the medical condition of the patient can then be extracted from the time sequence of the images. For example, in a perfusion study, a perfusion map can be extracted from the time sequence of the images in the dynamic image. In X-ray computer tomography (CT), perfusion scans can provide information on the blood flow and blood supply to vital organs. In another example, dynamic positron emission tomography (PET) can be used to estimate kinetic parameters that might improve the detection and characterization of tumors. Other examples of dynamic medical imaging for which dynamic imaging can be beneficial include cardiac CT, subtraction CT, digital subtraction angiography (DSA), dynamic PET, and CT profusion studies in which X-ray CT is performed during the injection and dispersion of a contrast dye in the patient.

One common challenge for dynamic PET and CT is that taking many images, even if the images are acquired using relatively low radiation dosages, can result in a large accumulated radiation dosage. In both PET and CT, diagnostic image quality is achieved by using at least a minimum radiation dose for each snapshot. Improving denoising of the dynamic image will enable this minimum radiation dose for diagnostic image quality to be lower.

High radiation dosages in dynamic imaging could be a barrier to widespread adoption of these methods. To decrease the per image radiation dosage while maintaining diagnostic image quality, iterative reconstruction methods have been proposed to jointly reconstruct the entire 4D volume (e.g., three spatial dimensions and a time dimension) by using a motion model or a kinetic model. However, these approaches can be complex and incur high computational costs. Accordingly, these approaches have not been widely adopted for commercial scanners.

Thus, a tension exists between minimizing the radiation dosage to a patient while maintaining diagnostic image quality. On the one hand, maintaining a low radiation dosage for each image is important for ensuring that the total radiation dosage does not become too high. On the other hand, the signal-to-noise ratio becomes poorer as the radiation dosage decreases. Accordingly, methods of improving image quality without increasing the radiation dosage play an important role in striking a balance between maintaining a low radiation dosage to the patient while obtaining images with diagnostic image quality.

BRIEF DESCRIPTION OF THE DRAWINGS

A more complete understanding of this disclosure is provided by reference to the following detailed description when considered in connection with the accompanying drawings, wherein.

DETAILED DESCRIPTION

Figure 1A:
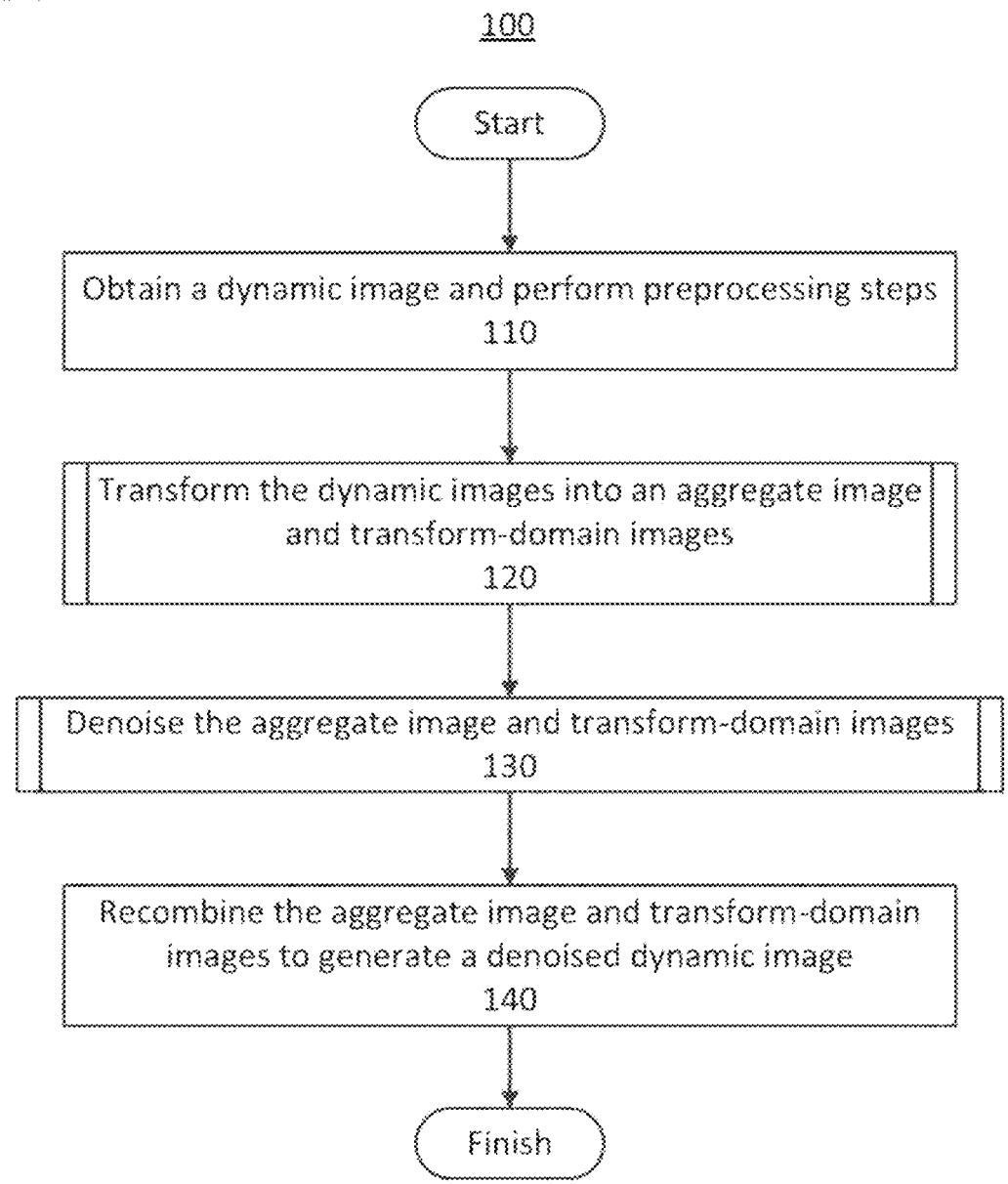
FIG. 1A shows a flow diagram of a sparsifying-transformation denoising method for dynamic images.

Dynamic imaging provides information of both spatial relations and temporal relations of the imaged subject. These dynamic images are sometimes referred to as four-dimensional (4D) images, corresponding to three spatial dimensions and a temporal dimension. Alternatively, fewer than three spatial dimensions could be used. However, in both X-ray computed tomography (CT) and position emission tomography (PET), three-dimensional (3D) spatial images can be obtained. Accordingly and without loss of generality, the methods and apparatuses described herein are discussed in the context of 4D dynamic images, but these methods can be applied to dynamic images with more or less than four dimensions. Further, the images described herein are described using a basic unit of pixels. The word "pixel" used herein is interpreted broadly to include a one-dimensional pixel, a two-dimensional pixels, and a three-dimensional volume pixel (i.e., voxels), for example.

Further, although dynamic images are specifically discussed herein, the methods described herein can be used for any series of snapshots (the word "snapshot" refers to an image selected from a series of images, the dynamic image being the combination of the series of images) in which snapshots within the series share significant features with the remaining snapshots (i.e., the snapshots are correlated along one dimension, the correlated dimension, which is often time). Accordingly, a sparse image can be obtained by taking a difference between various snapshots along the correlated dimension to illustrate the changes/differences between/among the snapshots. Stated differently, the changes between snapshots in the correlated dimension are sparse compared to the overall features in each snapshot. Thus, the methods described herein are not limited to a time-series of images, in which the correlated dimension is time.

In a dynamic image having a temporal dimension, such as dynamic images in a CT profusion study, the snapshots taken at different instances of time can be highly correlated in the time dimension, such that differencing time-adjacent snapshots of the dynamic image will yield sparse images. However, dimensions other than time can be used as the correlated dimension, such as phase. For example, cardiac CT images can be correlated with an EKG signal, and the correlated dimension of a dynamic cardiac dimension can be the cardiac phase, which is determined with reference to an EKG signal. Without loss of generality, the methods discussed herein are exemplified using the temporal dimension as the correlated dimension.

Denoising dynamic images can be important for minimizing the radiation dosage accumulated during the long exposure times of dynamic imaging. For example, even though an X-ray CT scanner or a PET scanner is capable of performing dynamic imaging such as perfusion imaging, subtraction imaging, and multi-phase cardiac imaging, it is desirable to maintain a low radiation dosage for each individual image in order to maintain an accumulated radiation dosage within acceptable bounds. Lowering the accumulated radiation dosage while simultaneously providing diagnostic quality dynamic images increases the likelihood that medical clinicians will use the dynamic imaging capability of present and future medical-imaging scanners. Methods using the redundancy and sparsity properties of dynamic images to denoise the dynamic images can improve image quality without increasing the radiation dosage, thus enabling lower radiation dosages.

The dynamic image denoising methods and apparatuses described herein reduce noise in the dynamic reconstructions so that the scan dose can be reduced. The methods described herein operate in the image space after the dynamic image has been reconstructed. Accordingly, these methods can be performed with lower complexity and fewer computational resources than iterative reconstruction techniques to jointly reconstruct the entire 4D image using a motion model or a kinetic model. These savings in complexity and computational resources make the methods described herein are compatible with commercial scanners. Additionally, the methods described herein are sufficiently flexible that, for specific applications, a motion model and/or a kinetic model can also be incorporated.

Reconstruction methods based on compressed sensing theory can be used to improve image quality for dynamic X-ray CT images. These compressed sensing-theory-based methods depend on the assumption that the image is sparse after certain transforms, an assumption that is not valid in some clinical images. However, in the 4D-CT case, although the background anatomic information can be non-sparse, the foreground signal due to motion and perfusion is generally sparse. In the methods described herein, a transformation of the dynamic image is performed to separate the images into an aggregate image representing the static background image common to all of the snapshots in the dynamic image, and a difference image (e.g., the transform-domain image) representing changes between/among the snapshots in the dynamic image. These transform-domain images can be sparse, making them compatible with denoising by compressed sensing-theory-based methods. This transformation from a dynamic image to the aggregate image and the transform-domain images is referred to herein as a "sparsifying transformation," and the inverse transformation as referred to herein as an "inverse sparsifying transformation." This sparsifying transformation can be used for various 4D CT and PET applications, such as those mentioned above.

Further, the sparsifying transformation can be used with any series of images sharing significant redundant information among the various snapshots in the series of the dynamic image.

The transform-domain images are sparse, which makes them compatible with the denoising methods discussed herein. In certain implementations, the aggregate image benefits from averaging over all of the snapshots of the dynamic image, such that redundant features in each snapshot are reinforced by the averaging, and the noise, which is assumed to be zero-mean and uncorrelated, tends to average to zero. The transform-domain images on the other hand include most of the noise from the original dynamic image. A denoising method is then applied to the transform-domain images, and this denoising method can advantageously use the sparsity of the transform-domain images to separate the signal, which tends to be localized and correlated among the pixels of the transform-domain images, from the noise, which tends to not be localized and to be uncorrelated. After performing denoising on the transform-domain images, most of the noise is removed, and the transform-domain images be recombined with the aggregate image to generate a denoised dynamic image.

The methods described herein are motivated in part by the redundancy and sparsity properties of the dynamic image. As discussed above, in dynamic imaging, the snapshots at different times can be very similar except for a few local differences due to motion and physiology. Therefore, a sequence of snapshots can be highly redundant, while the differences between time-adjacent snapshots can be sparse. On the other hand, the noise in the image does not have these same redundant and sparse properties. On the contrary, noise between time-adjacent snapshots can be uncorrelated. Additionally, the noise can appear anywhere within the time-adjacent snapshots, therefore the noise is not localized or sparse. In the methods described herein, the redundancy and sparsity of time-adjacent snapshots is part of the model used to differentiate signals from noise.

In order to use the redundancy and sparsity in the dynamic image, the methods described herein transform the dynamic image from a time domain to a transform-domain in which the redundant information from the dynamic image is aggregated into an aggregate image, which has a high signal-to-noise ratio, and the kinetic information from the dynamic image is represented in a series of transform-domain images, which are sparse and also include most of the noise from the dynamic image. This transformation is referred to as the sparsifying transformation.

For example, using $y_a(t_n)$ to represent a pixel of the image $P(j,k,l,t_n)$ at time $t_n$, wherein a is used as a shorthand combining the indices i, j, and l into a single index, and assuming the dynamic image is a time sequence of No snapshots sampled at times $t_n$, where the time index in n=1, ..., N, the sparsifying transform can be written as $$\begin{bmatrix} y_{0,a} \\ \vec{d}_a \end{bmatrix} = S\vec{y}_a$$

wherein a is an index indicating a spatial location of the pixels, $\vec{y}_a$ is a column vector of size N×1 of a time sequence for pixel a. the vector $\vec{y}_a$ can be referred to as the pixel trajectory. The aggregate pixel value for the pixel trajectory of pixel a is given $y_{0,a}$, and $\vec{d}_a$ is the transform-domain pixel values, which is column vector of size K×1 and includes the kinetic coefficients from the sparsifying transformation. These kinetic coefficients tend to zero when the pixel values tend to not change over time. In this context, the sparsifying transform operator S can be represented as a matrix of size (K+1)×N. Therefore, the time sequence for each pixel trajectory a can be represented by $y_{0,a}$ and $\vec{d}_a$.

The aggregate image is generated by combing all of the aggregate pixel values at their respective pixel locations—the sparsify transformation does not affect the spatial dimensions. Similarly, the $k^{th}$ transform-domain image is generated by combining the $k^{th}$ kinetic coefficient of the transform-domain pixel vectors $\vec{d}_a$ at their respective pixel locations.

In this representation, $y_{0,a}$ can be estimated from all time samples. For example, $y_{0,a}$ can be computed by averaging all the time samples in the pixel trajectory. In the averaging process, the noise will tend to be averaged out, whereas the signal can be enhanced by averaging due to the redundancy in the signal. Therefore, $y_{0,a}$ tends to have a high signal-to-noise ratio. On the other hand, the transform-domain of a pixel trajectory $\vec{d}_a$ tends to be sparse. Therefore, the vectors $\vec{d}_a$ can be denoised using a denoising method that uses a sparsity constraint.

After applying the sparsifying transformation, the kinetic transform-domain vectors can be denoised, and then the baseline and kinetic images can be transformed back to the dynamic image domain using a synthesizing transform B, which is given by the expression $$\vec{y}_a = B\begin{bmatrix} x_{0,a} \\ \vec{d}_a \end{bmatrix}.$$

In the case that K=N, the synthesizing and sparsifying transforms can be defined such that BS=I, where I is the identity matrix. Thus, no information will be lost by transforming back and forth using the sparsifying and synthesizing transforms. In choosing the forms of the sparsifying and synthesizing transforms S and B, the sparsifying transform S can be chosen first, and then the synthesizing transforms B can be defined such that $B=S^{-1}$.

Alternatively, the synthesizing transforms B can be chosen first. For example, the synthesizing transforms B can be an operator that projects the time sequence onto a set of basis functions. When the basis functions are selected to sparsely approximate the pixel trajectories, the act of projecting onto the basis functions can perform functions of denoising the dynamic image. Among pixel trajectories, the kinetic signals can be highly correlated, which means that a good approximation for each of the pixel trajectories can be obtained using a linear superposition of only a few basis functions that are chosen to be similar to the shape of the kinetic signals. For example, the pixel trajectories are highly correlated and can be approximated using a sparse approximation using only a few basis functions. On the other hand, the noise is uncorrelated, and therefore the sparse approximation poorly approximates the noise. Thus, by projecting onto appropriately chosen basis functions, the noise can be projected out while the kinetic signal is preserved. Stated differently, the basis functions can be selected to simultaneously approximate the kinetic signals in the dynamic image while projecting out the noise.

For example, as discussed below, the effect of projecting out the noise and preserving the kinetic signal is achieved when the basis functions are determined using principal component analysis (PCA) to project the dynamic images onto basis functions corresponding to the principal components, i.e., the eigenvectors corresponding to the largest eigenvalues of the covariance matrix from the PCA analysis. These basis functions correspond predominantly to the kinetic signals, and the smaller components, which are not used as basis functions, will correspond to the noise. Thus, using the principal components as the basis function to sparsely approximate the dynamic image, the desired kinetic signal is preserved while the noise is projected out.

For example, the basis function representation of a pixel trajectory can be expressed as $$y_a(t) = f(x_{0,a}, d_{1,a}, \ldots, d_{K,a}, t) = x_{0,a} + \sum_{k=1}^{K} d_{k,a} b_k(t),$$

wherein $b_k(t)$ are a set of predefined one-dimensional basis functions to represent the pixel values as a function of time, and $d_k$ are the transform-domain coefficients of a pixel trajectory. In this representation, B is defined by the time samples of the basis functions.

An objective in choosing the S and B matrices is to select the basis functions that enable a sparse approximation of the pixel trajectories when expressed by the transform-domain coefficients. Thus, the number of basis function, K, can be less than the number of time samples. In this case, by projecting the time sequence onto the basis function space, noise reduction can be achieved. This is the case for the PCA-based denoising method discussed herein.

Alternatively, as in the case of over-compete dictionaries, which is also discussed herein, K can be chosen to be much greater than the number of time samples (e.g., an over-complete basis), and sparsity of the transform-domain coefficients can be enforced using an external constraint. For example, the basis functions can be regarded as a dictionary of all possible voxel kinetics, which represent the kinetic signals well, but poorly approximate the noise. The K-SVD method is provided herein as an example of a method using an over-complete dictionary to generate sparse approximations of the pixel trajectories. In contrast to the PCA-based denoising method, which can perform both the sparsifying transformation and denoising as a single step, the K-SVD method described herein is performed in two steps. First, the sparsifying transformation is performed to generate the transform-domain images, and then the K-SVD method performs the sparse approximation of the pixel trajectories to obtain the kinetic signal without the noise.

In the PCA-based method, the basis functions used to transform from the dynamic image to the transform-domain images simultaneously project out the noise as part of the sparsifying transformation. Thus, in the PCA-based method, both the sparsifying transformation and the denoising are achieve in a single step. However, after the sparsifying transformation and before the inverse sparsifying transformation, additional denoising methods can be applied to the transform-domain images. Thus, in addition to selecting basis functions to project out the noise, the method described herein can include a second step of denoising while in the transform domain. Technically, the K-SVD denoising is performed during this second step. The sparsity of the transform-domain coefficients can be beneficial exploited in this step by using a sparsity enforcing norm (e.g., $L_0$ or $L_1$) or a general edge preserving prior.

As exemplified by the K-SVD method, in certain implementations, the denoising step can be separate and independent from the transformation step, such that the sparsifying transformation is performed first and then a denoising step is performed second before transforming back to the dynamic-image domain. In other implementations, as exemplified by the PCA-based method, the denoising step is integrated in the sparsifying transformation, such that the transformation itself performs functions of denoising the dynamic image. In these implementations, an additional step of denoising separate from the sparsifying transformation can be omitted.

Referring now to the drawings, wherein like reference numerals designated identical or corresponding parts throughout the several views, FIG. 1A shows a flow diagram of a method 100 for denoising a dynamic image.

In step 110 of method 100, the dynamic image is obtained. Additionally, various preprocessing steps can be performed on the dynamic image. In certain implementations, the dynamic image can be obtained using a CT scanner to generate projection data by performing a CT scan of an object OBJ and then reconstructing a time-series of 3D images from the projection data such that the time series of images is the 4D dynamic image. Preprocessing of the dynamic image can include such steps as performing material decomposition of dual-energy projection data, for example. Further, the preprocessing of the dynamic image can include a registration process to correct for unintended movements by the patient. The registration process can rotate and translate the frame of the snapshots of the dynamic image to correct for the patient's movements. Accordingly, the difference between snapshots of the dynamic image will be limited changes of interest, such as the profusion of a contrast dye, rather than unintended movements by the patient. The preprocessing can also include calibration corrections, linearity corrections, detector-response corrections, scatter corrections, various image processing steps, and preliminary smoothing, filtering, or denoising.

In certain implementations, the projection data will have been acquired previously, and obtaining the dynamic images includes reading the projection data from memory and reconstructing the dynamic image from the projection data. Alternatively, the dynamic image can be reconstructed previously and stored in a computer readable memory, in which case, obtaining the dynamic image can entail reading the dynamic image from the computer-readable memory in which it has been stored.

In process 120 of method 100, the sparsifying transformation is performed to generate the aggregate image and the transform-domain images.

In process 130 of method 100, the denoising method is applied to the aggregate image and the transform-domain images. The denoising method applied to the aggregate image can be different than the denoising methods applied to the transform-domain images, and, in certain implementations, denoising of the aggregate image can be omitted. For example, the transform-domain images can be sparse and the aggregate image can be non-sparse. Accordingly, denoising methods adapted to sparse images can be applied to the transform-domain images, whereas other denoising method can be applied to the aggregate image. In certain implementations, the denoising method is applied to the transform-domain images but a denoising method is not applied to the aggregate image.

In step 140 of method 100, after the transform-domain images have been denoised, the transform-domain images can be recombined with the aggregate image using an inverse sparsifying transformation.

Figure 1B:
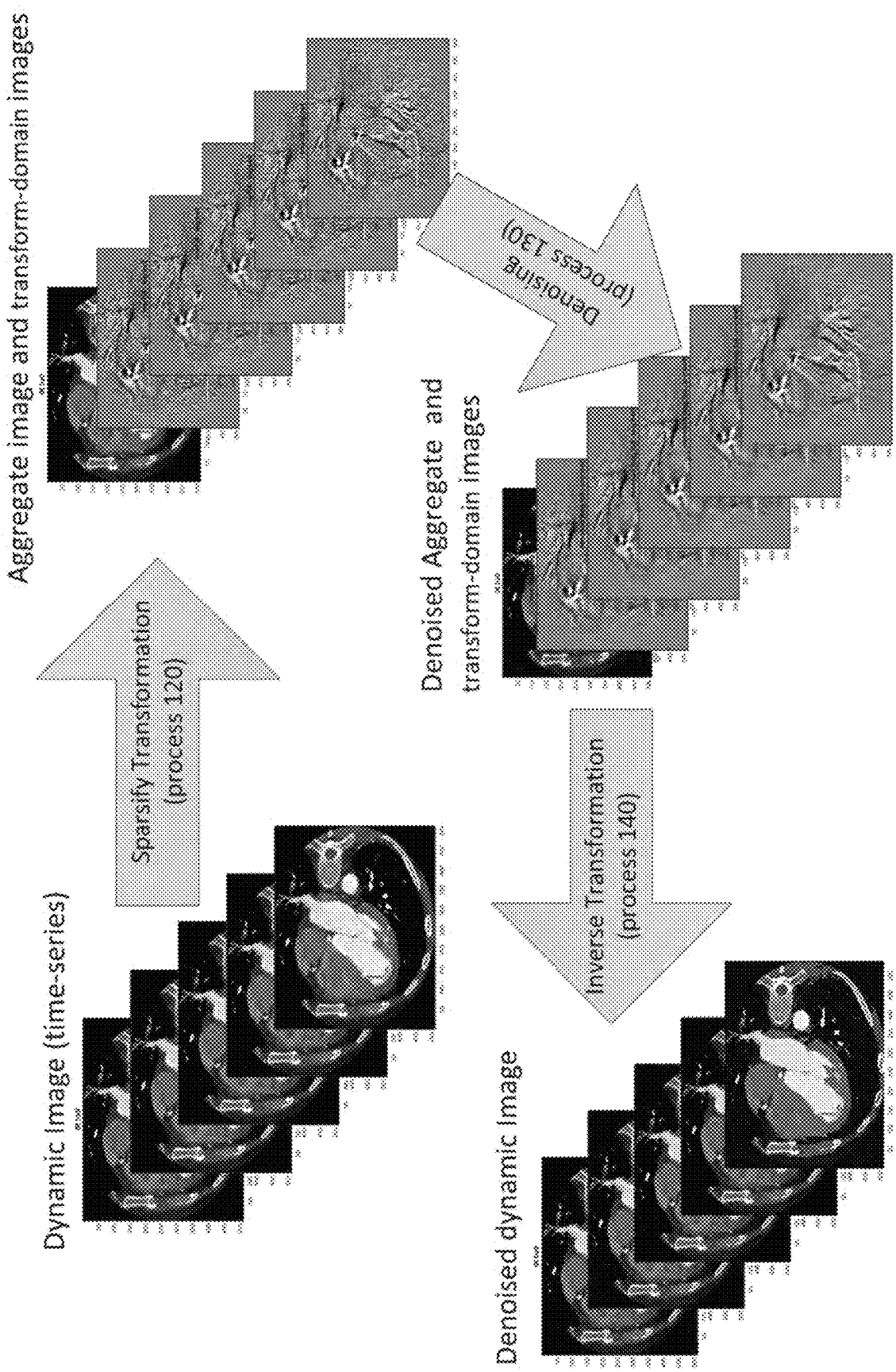
FIG. 1B shows a dynamic image having five snapshots being transformed using the sparsifying-transformation and then being denoised before transforming back into the dynamic-image domain.

FIG. 1B shows an example of a times-series of five cardiac images being transformed using a sparsifying transformation (process 120) into an aggregate image an five transform-domain images. Next, the aggregate image and five transform-domain images are denoised (process 130), after which the denoised images are inverse transformed (process 140) back into five denoised cardiac images.

Figure 2A:
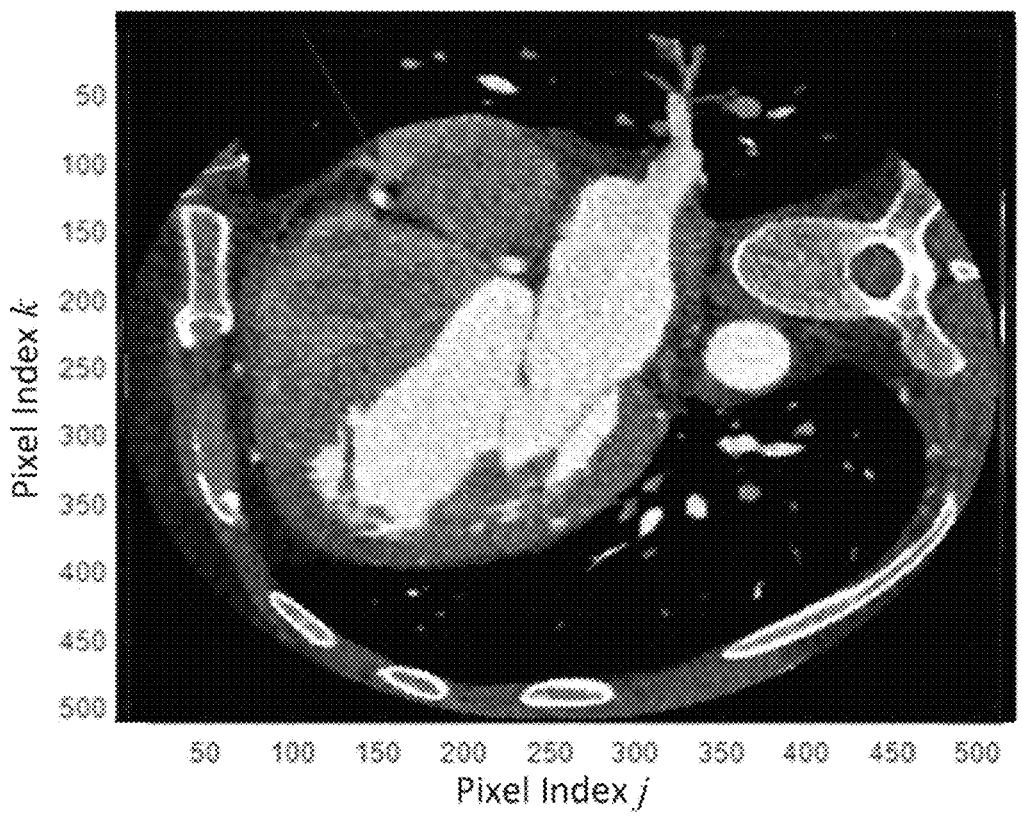
FIG. 2A shows a half-scan reconstructed CT image.
Figure 2B:
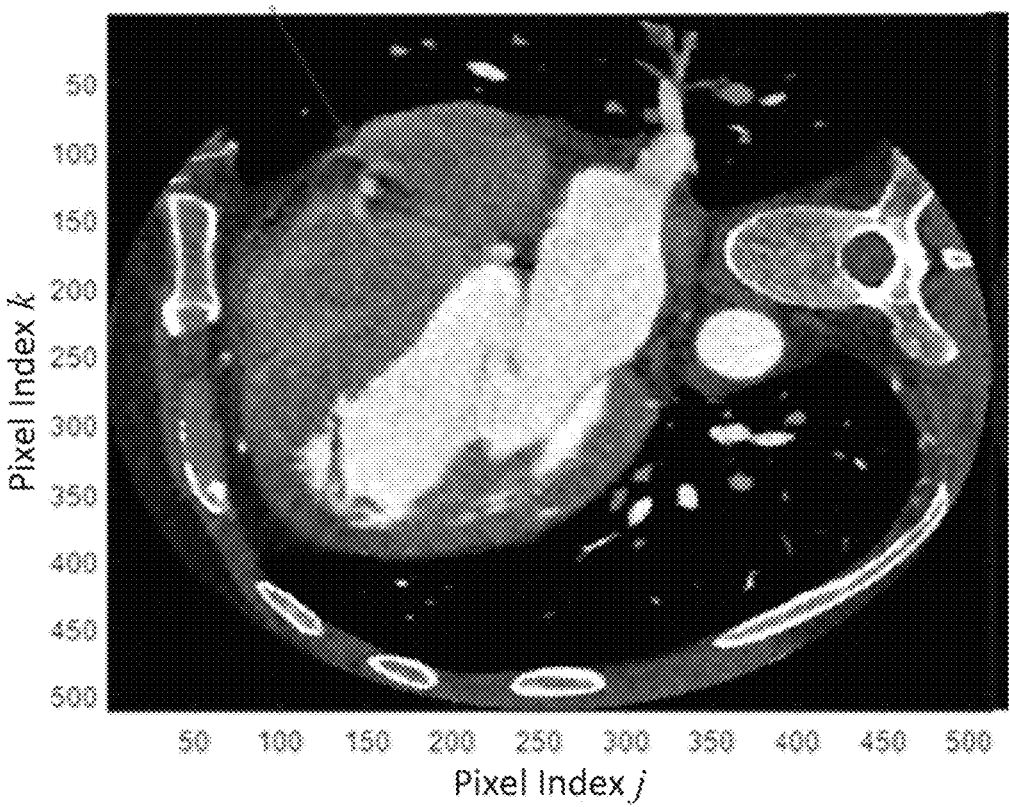
FIG. 2B shows a full-scan reconstructed CT image.
Figure 2C:
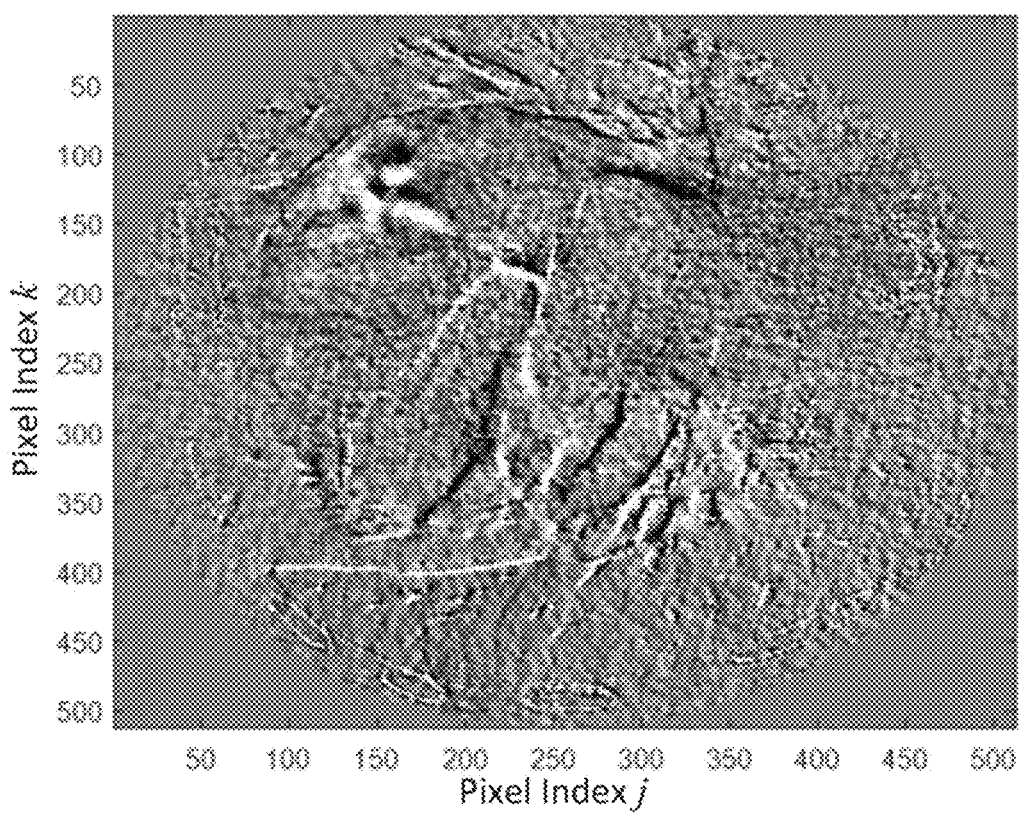
FIG. 2C shows an image representing a difference a between the half-scan reconstructed CT image and the full-scan reconstructed CT image.
Figure 2D:
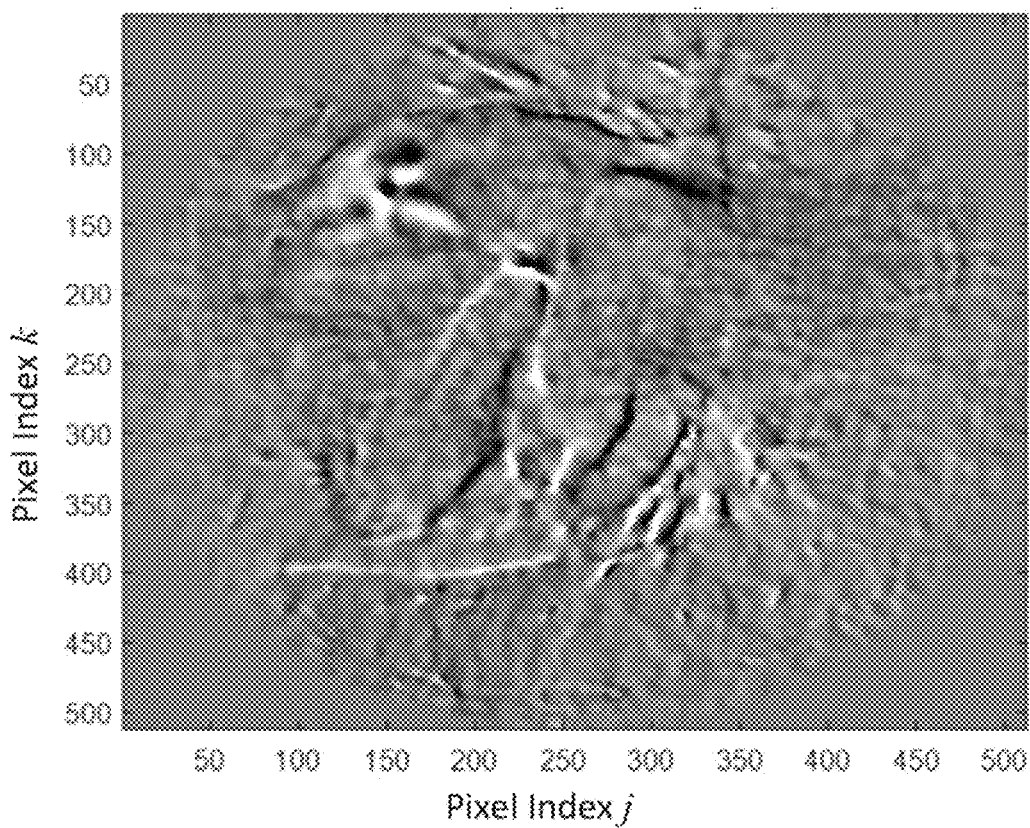
FIG. 2D shows the image from FIG. 2C after denoising.
Figure 2E:
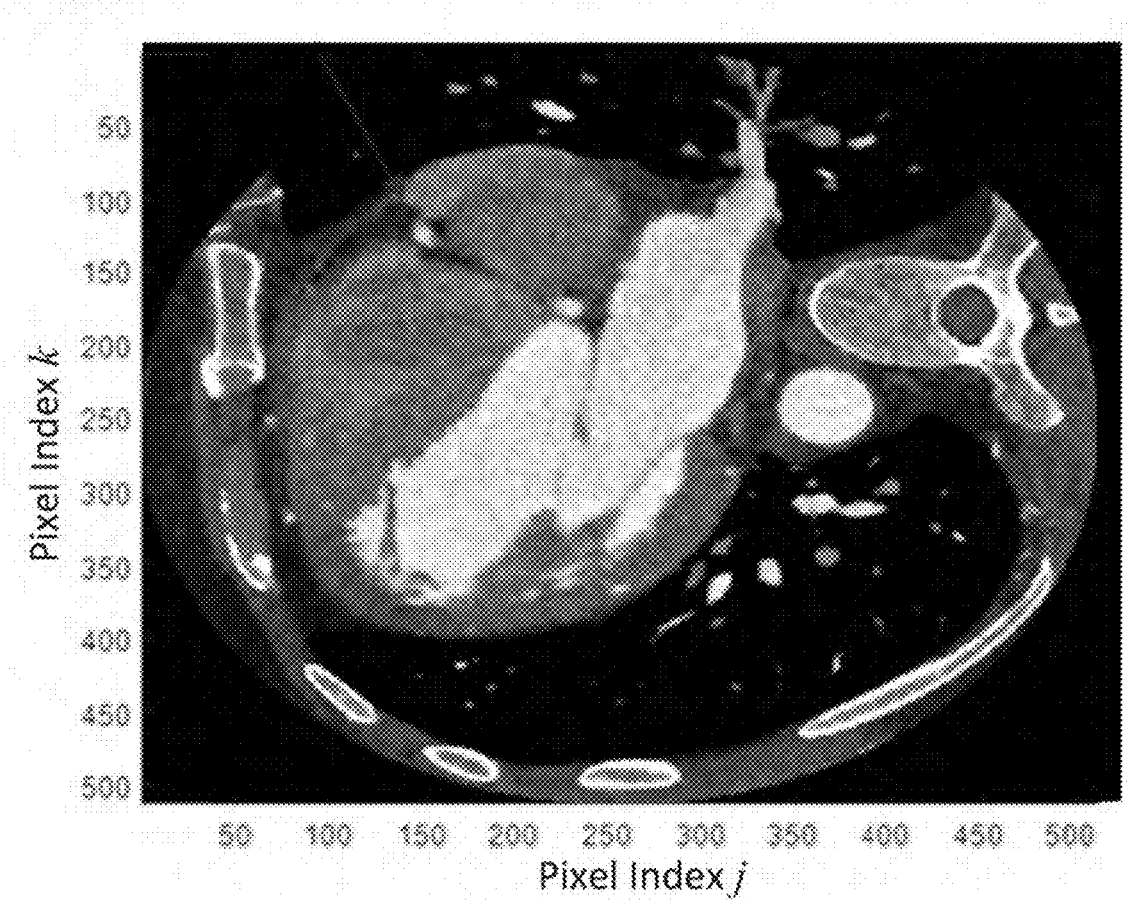
FIG. 2E shows a denoised half-scan reconstructed CT image.

FIG. 2A shows an example of a snapshot of the dynamic image. The image in FIG. 2A is a reconstruction based on a half scan (e.g., a scan in which the scanner rotates through 180° plus two times the fan angle). Half-scan reconstructions are desirable for cardiac CT because they have better temporal resolution than a full-scan. FIG. 2B shows a full-scan reconstruction, which has lower noise than the half-scan reconstruction, but at the expense of poorer time resolution. In this case, the full-scan image can be used as the aggregate image and a difference image can be obtained by taking a difference between the half-scan and full-scan images. This difference is shown in FIG. 2C. FIG. 2D shows a denoised image corresponding to the transform-domain image from FIG. 2C. Recombining, the denoised transform-domain image from FIG. 2D with the full-scan image from FIG. 2B provides a denoised half-scan image, which is shown in FIG. 2E. Thus, in FIG. 2E both improved temporal resolution and decreased noise are simultaneously achieved.

Figure 3:
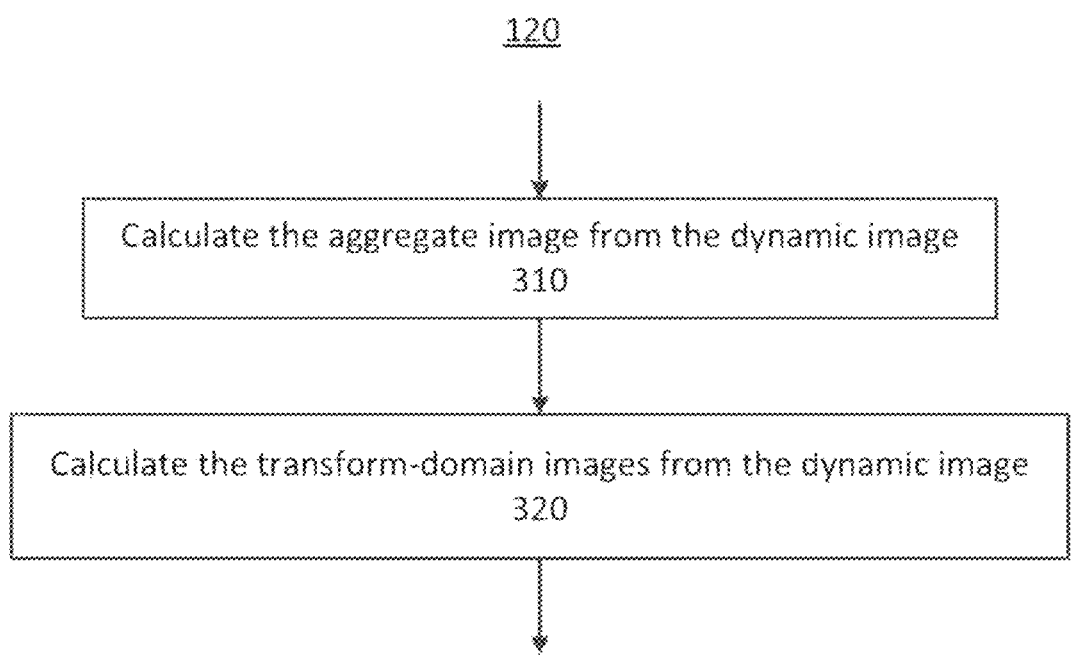
FIG. 3 shows a flow diagram of a process to perform a sparsifying transformation.

FIG. 3 shows a flow diagram of process 120 for performing the sparsifying transformation on a dynamic image.

In step 310 the aggregate image is calculated. For example, the aggregate image can be an average of all of the snapshots in the dynamic image. Also, in cardiac CT, the snapshots can be images acquired at different cardiac phases. In profusion imaging, the snapshots can be a time-series of images representing changing attenuation as a contrast dye is injected into a patient and flows more quickly into regions having higher blood flow and/or higher blood supply.

In a dynamic image representing a time series, the differences between two snapshots acquired in adjacent time intervals can be relatively small and the differences are generally localized. Additionally, in the transform-domain images, the shape traced out by each pixel location as a function of time can be a smooth function, and the shapes of these pixel trajectories as a function of time can have a similar shape to the shape of the pixel trajectories for neighboring pixels, for example. The redundancy created by these similarities can be used to separate the features of the transform-domain images from the noise to denoise the transform-domain images.

Each of the snapshots can be expresses as $P_n = P(i,j,l,t_n)$, wherein i, j, and l are the indices of the three spatial coordinates, $t_n$ is the time of the snapshot, and n is the time index. Each snapshot can be represented as a three-dimensional matrix of pixel values having J rows, K columns, and L layers. A pixel trajectory of the dynamic image can be given by a one-dimension column vector using the notation $$y_{jkl} = [P(i,j,l,t_1), P(i,j,l,t_2) K, P(i,j,l,t_N)]^T,$$

where N is the total number of snapshots in the dynamic image.

When the number of snapshots $P_n = P(j,k,l,t_n)$ is equal to N, the aggregate image $P_0$ can be given by $$y_0(i,j,l) = \frac{1}{N}\sum_{n=1}^{N} P_n.$$

To simplify notation, the i, j, and l indices are generally omitted unless relevant in a particular context. In addition to the above definition for the aggregate image, other definitions can also be used. For example, the aggregate image can be defined as the first snapshot in the time-series of the dynamic image. Further, the aggregate image can be defined as a full-scan of a cardiac image, as exemplified above.

In step 310, the transform-domain images are calculated. In certain implementations, the transform-domain images can be given by $$d_k = P_{k-1} - P_k,$$

wherein k=1,2,K,N−1. An advantage of this definition of the transform-domain images is that generally the variations between time-adjacent snapshots will be smaller for snapshots taken at a closer temporal proximity. Thus, this definition tends to provide transform-domain images with a minimum of features. The inverse sparsifying transformation corresponding to the above transform-domain images $d_k$ can be given by $$P_a = P_0 - \frac{1}{N}\sum_{k=1}^{N-1}(N-k)d_k + \sum_{k=1}^{n-1}d_k.$$

In certain implementations, another definition of the sparsifying transformation can be used. In this other sparsifying transformation, the transform-domain images can be given by $$d_l = P_k - P_0,$$

where k=1,2,K,N. The inverse sparsifying transformation corresponding to this sparsifying transformation can be given by $$P_n = P_0 + d_k.$$

Whichever sparsifying transformation is used, the sparsifying transformation can be represented by a transformation operator S and the inverse sparsifying transformation can be represented by a transformation operator $B=S^{-1}$, wherein B and S can be expressed as matrices.

Other transformations can also be used to transform a dynamic image into an aggregate image and transform-domain images. Any definition can be used that represents a background of common features shared by the snapshots of the dynamic image. For example, the aggregate image can be one of the snapshots of the dynamic image. As would be recognized by a person of ordinary skill in the art, any sparsifying transformation can be used that separates a dynamic image into an aggregate image representing a common background of the snapshots and transform-domain images representing changes between the snapshots.

The sparsifying transformation generates transform-domain images that are sparse. By separating out the background, which is included in the aggregate image, from the transform-domain images, the transform-domain images include both kinetic signals corresponding to changes between the snapshots and uncorrelated random noise. The kinetic signals can be localized, whereas the noise can be randomly distributed throughout the difference image. This aspect of the kinetic signal can be used to differentiate and isolate the kinetic signals from the noise in the transform-domain images. In particular, the noise can be well represented using a sparse approximation using a linear combination of basis functions taken from an appropriately chosen dictionary (e.g., an over-complete dictionary trained using a subset of pixel trajectories from the transform-domain images). This sparse approximation has the effect of projecting out the noise, which is not well approximated using the sparse approximation.

In process 130, the transform-domain images are denoised. One or more denoising methods can be used. As discussed above, a sparse approximation can be used to denoise the images. These sparse approximation methods of denoising can operate in the dimension of the transform domain. In certain implementations, the denoising method can also operate in the spatial dimensions, in addition to operating in the transform-domain dimension. Denoising methods in the three spatial dimensions are discussed first before returning to the sparse approximation methods operating the dimension of the sparsifying transformation.

Many spatial-domain methods of denoising can be applied to the transform-domain images, including: linear smoothing filters, anisotrophic diffusion, non-local means, and nonlinear filters.

Linear smoothing filters remove noise by convolving the original image with a mask that represents a low-pass filter or smoothing operation. For example, the Gaussian mask comprises elements determined by a Gaussian function. This convolution brings the value of each pixel into closer agreement with the values of its neighbors. In general, a smoothing filter sets each pixel to the average value, or a weighted average, of itself and its nearby neighbors, the Gaussian filter is just one possible set of weights. Disadvantageously, smoothing filters tend to blur an image because pixel intensity values that are significantly higher or lower than the surrounding neighborhood are smeared or averaged across their neighboring area. Sharp boundaries become fuzzy. Generally, local linear filter methods assume the homogeneity could be found in the local neighborhood are homogenous and therefore tend to impose homogeneity on the image obscuring non-homogeneous features, such as lesions or organ boundaries.

Anisotropic diffusion removes noise while preserving sharp edges by evolving an image under a smoothing partial differential equation similar to the heat equation. If the diffusion coefficient were a spatially constant, this smoothing would be equivalent to linear Gaussian filtering, but when the diffusion coefficient is anisotropic according to the presence of edges, the noise can be removed without blurring the edges of the image.

A median filter is an example of a nonlinear filter and, if properly designed, a nonlinear filter can also preserve edges and avoid blurring. A median filter operates, for example, by evaluating each pixel in the image, sorting the neighboring pixels according to intensity, and replacing the original value of the pixel with the median value from the ordered list of intensities. The median filter is one example of a rank-conditioned rank-selection (RCRS) filter. For example, median filters and other RCRS filters can be applied to remove salt and pepper noise from an image without introducing significant blurring artifacts.

In addition to filtering, various regularization methods can be used in conjunction with the image reconstruction algorithm. For example, a total-variation (TV) minimization regularization term can be used where it is assumed that the areas being images are uniform over discrete areas with relatively sharp boundaries between the areas. A TV filter can also be used as another example of a nonlinear filter.

In non-local means filtering, rather than performing a weighted average of pixels according to their spatial proximity, pixels are determined to be a weighted average according to the similarity between patches within the images. Thus, noise is removed based on non-local averaging of all the pixels in an image—not just the neighboring pixels. In particular, the amount of weighting for a pixel is based on the degree of similarity between a small patch centered near that pixel and another small patch centered around the pixel being de-noised.

Now denoising methods operating in the transform-domain dimension are discussed. In certain implementations, the process 130 of denoising the transform-domain images includes projecting out the noise by generating sparse approximations of the pixel trajectories. These sparse approximations can be generated by first using a K-SVD machine-learning method to develop a dictionary corresponding to shapes derived from the pixel trajectories themselves, and then using a matching pursuit or similar method to optimize a linear combination of the dictionary shapes to match the shape of each pixel trajectory. This sparse approximation is performed in the transform domain.

In the K-SVD method, a dictionary of basis functions (in the vernacular of dictionary-based sparse approximation methods, these basis function can be referred to as atoms) can be generated by training using a subset of pixel trajectories from the transform-domain image data. The learned dictionary can then be used to approximate the pixel trajectories for all of the pixel indices/locations (i,j,l) of the transform-domain image data, which can each be approximated as a linear superposition of the atoms of the dictionary. When the atoms of the dictionary form an over-complete set of basis functions for representing the pixel trajectories of the transform-domain images, sparse approximations of the images can be generated, and the transform-domain images can be denoised by using these sparse approximations to represent the respective transform-domain images. For example, an orthogonal matching pursuit (OMP) method can be used to generate the denoised transform-domain images by approximating the transform-domain images using the dictionary to generate a sparse approximation of the pixel trajectories of the transform-domain images.

The dictionary contains basis functions that can be combined in a linear superposition to approximate the series of transform-domain images. For example, if there are N transform-domain images and each transform-domain image can be represented as a three-dimensional matrix having l rows, J columns, ad L layers of pixel values, then the transform-domain images can be thought of as being M=l× J×L pixel trajectories, wherein each pixel trajectory is N coefficients long. A dictionary of one-dimensional curves, each with N values, can be used as the basis functions for approximating the shape of each pixel trajectory. Whereas orthonormal basis functions such as the Legendre polynomials can approximate any shape of a pixel trajectory by using a large number of transform coefficients, a well chosen over-complete set of basis functions can approximate the pixel trajectories using only a few transform coefficients (i.e., a sparse approximation). This capability of a dictionary to generate sparse approximations is especially true when the basis functions are generated by training using a subset of actual pixel trajectories from the transform-domain images.

Figure 5A:
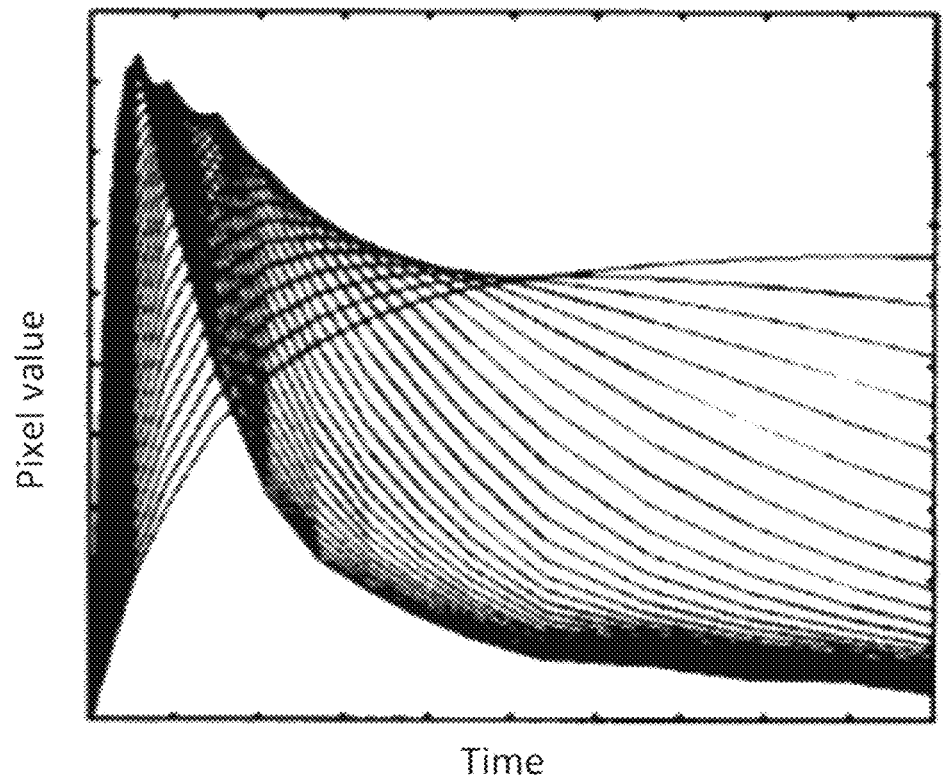
FIG. 5A shows a first set of one-dimensional kinetic basis functions.
Figure 5B:
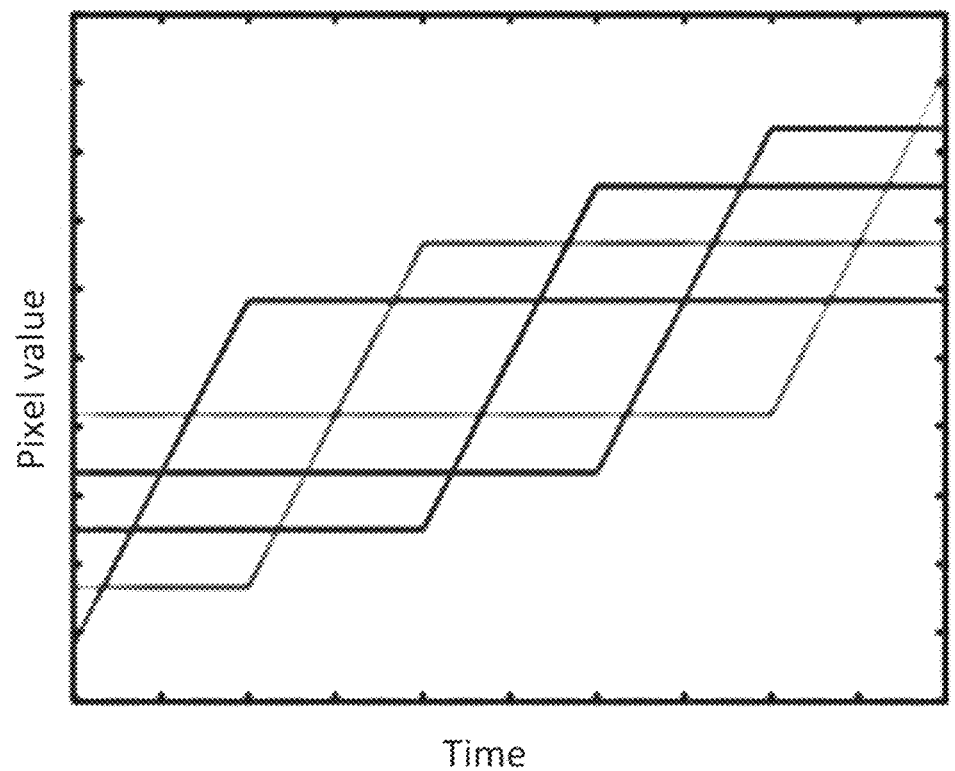
FIG. 5B shows a second set of one-dimensional kinetic basis functions.

Also, a well-chosen dictionary can be obtained using a priori knowledge of the shape of the pixel trajectories. For example, in perfusion studies, the dictionary can be based on a kinetic model and the underlying physiology of blood supply to vital organs. In this case, the basis functions shown in FIGS. 5A and 5B, for example, can provide well-chosen dictionaries for a sparse approximation of various pixel trajectories in profusion studies. Dictionaries based on objective criteria, such as the kinetic-model-based basis functions discussed above, can be referred to as designed dictionaries. On the other hand, dictionaries generated by training on a subset of data to be approximated can be referred to as learned dictionaries. In process 130 of method 100, either a designed dictionary or a learned dictionary can be used for denoising the transform-domain images. In the K-SVD method the dictionary is a learned dictionary.

In certain implementations, a K-SVD method will be used to generate the dictionary and approximate the transform-domain images. The K-SVD method is a dictionary learning algorithm for creating a dictionary for sparse representations, via a singular value decomposition approach. The K-SVD method is a generalization of a k-means clustering method, and it works by iteratively alternating between sparse coding the input data based on the current dictionary, and updating the basis functions in the dictionary to better fit the data. The basis functions in the dictionary can be referred to as atoms.

The K-SVD method learns an over-complete dictionary matrix $D \in _i^{N \times K}$ that contains K signal-atoms (in the matrix notation an atom can be a column of the matrix D representing the dictionary). A signal vector $y \in _i^N$ can be sparsely approximated using a linear combination of the atoms of the dictionary D. In the context of the transform-domain images, the signal vectors y can be the pixel trajectories. The sparse approximation to the signal vector y can be represented by x, wherein x can be given by a matrix equation $$y \approx Dx.$$

In the context of the transform-domain images, the vectors x can be the sparse approximation coefficients. In certain implementations, the approximation to the signal vector y can be more precisely defined by requiring that $\|y - Dx\|_p \le \grave{o}$, for a predefined small value $\grave{o}$ and a predefined p-norm $L_p$ (e.g., the p-norm can be one of the $L_1$, $L_2$, or $L_n$ norms).

If N<K and D is a full-rank matrix, an infinite number of solutions are available for the representation problem y=Dx. Accordingly, constraints can be set on the solution to limit the solution to have certain desirable properties such as selecting those solutions that are sparse. To achieve sparsity, the solution with the fewest number of nonzero coefficients is preferred. Thus, a sparse representation of the solution can be obtained by constraining the solutions according to $$\min_x \|x\|_0 \text{ subject to } y = Dx.$$

wherein $\|x\|_0$ counts the nonzero entries in the vector x. Similarly, a sparse approximation of the solution can be obtained by constraining the solutions according to $$\min_x \|x\|_0 \text{ subject to } \|y - Dx\|_p \le \grave{\alpha}$$

In certain implementations, the K-SVD method can be performed as a generalization of a D-means algorithm. For example in the K-means algorithm, k-means clustering can be used to create a sparse representation by finding the best possible codebook to represent the data samples. $Y = \{y_i\}_{i=1}^M$ using a nearest neighbor search, by solving $$\min_{D,X} \{\|Y - DX\|_V^2\} \text{ subject to } \forall i, x_i = e_k \text{ for some } k,$$

which is quite similar to $$\min_{D,X} \{\|Y - DX\|_V^2\} \text{ subject to } \forall i, \|x_i\|_0 = 1,$$

wherein $\| \|_F$ is the Forbenius norm, the approximations to the signal vectors Y are $X = \{x_i\}_{i=1}^M$, and $e_k$ are the basis vectors of the signal vectors. The sparse representation term $x_i = e_k$ constraints the K-means algorithm to use only one atom (column) in the dictionary D. To relax this constraint, the K-SVD method represents the signal vectors as a linear combination of atoms in D.

The K-SVD method can be similar to the K-means algorithm, except that, in order to achieve a linear combination of atoms in D, the sparsity constraint is relaxed so that the number of nonzero entries used in each column $x_i$ can be more than one, but less than a predefined threshold $T_0$.

In certain implementations, the dictionary D and approximations X can be found as solutions to the equation $$\min_{D,X} \{\|Y - DX\|_F^2\} \text{ subject to } \forall i, \|x_i\|_0 = T_0.$$

Alternatively, the dictionary D and approximations X can be found as solutions to the equation $$\min_{D,X} \sum_i \|x_i\|_0 \text{ subject to } \forall i, \|Y - DX\|_V^2 \le \grave{\alpha}$$

Alternatively, the dictionary D and approximations N can be found as solutions to the equation $$\min_{D,X} \left\{ \sum_i \|y_i - Dx_i\|_F^2 + \lambda \|x_i\|_0 \right\}.$$

wherein $\lambda$ is a weighting factor.

Solving any of the above formulations of the combined problem of optimizing the dictionary and determining a sparse approximation for each of the signal vectors using the dictionary can be performed using an iterative method by alternating between optimizing the dictionary D with the approximation coefficients in X fixed, and then optimizing the approximation coefficients in X with the dictionary fixed, and so forth. For example, an approximation pursuit method can be used to determine the approximation coefficients in X. For example, the orthogonal matching pursuit (OMP) method can be used to calculate the approximation coefficients in X, subject to a sparsity constraint condition. After the sparse coding task of optimizing the approximation with the dictionary D fixed, the method proceeds by optimizing the dictionary D. The methods of optimizing the dictionary D are conventional and will not be discussed herein.

Figure 4:
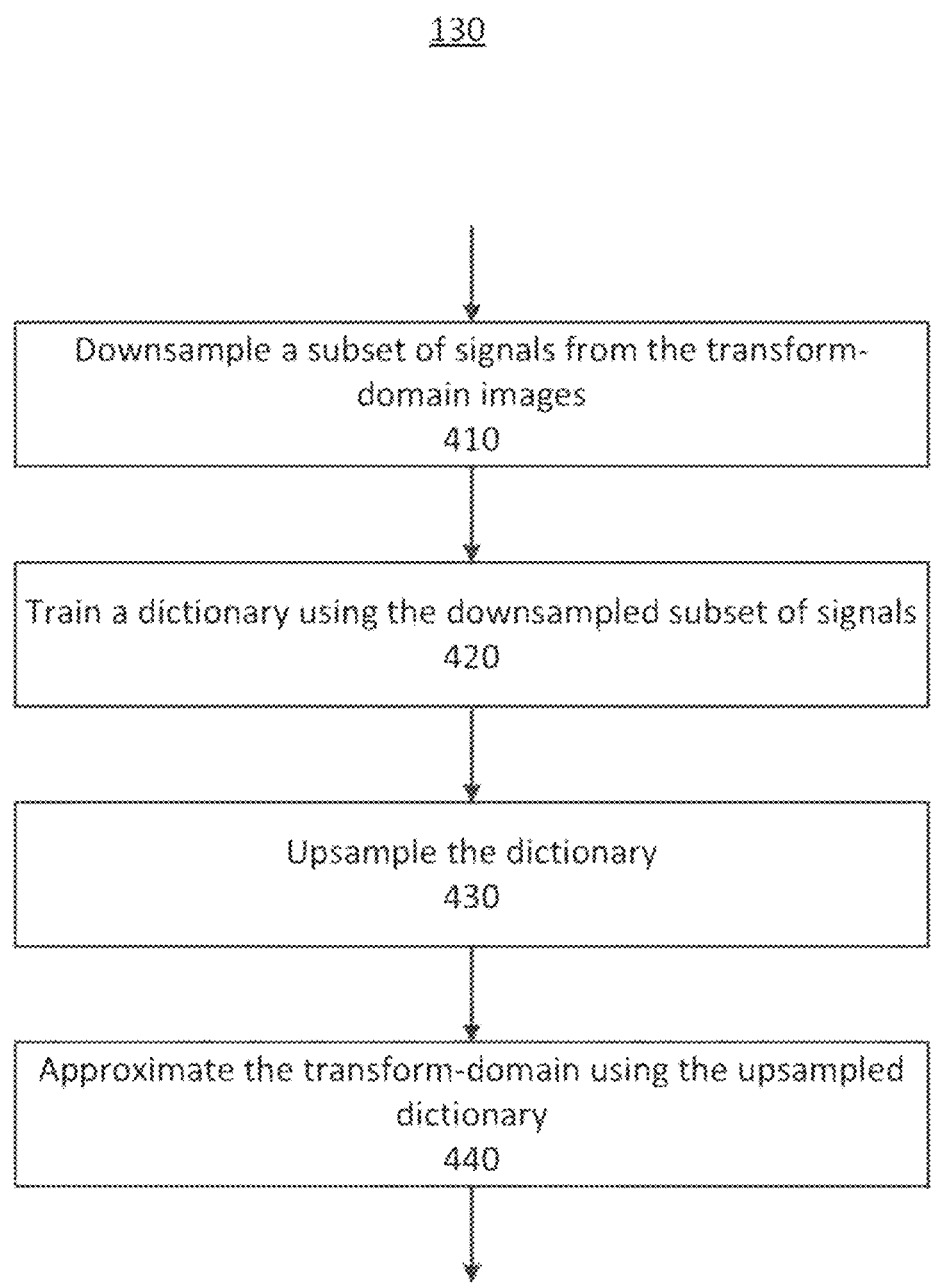
FIG. 4 shows a flow diagram of a process to denoise the transform-domain images.

A dictionary D can be trained using only a subset of the signal data Y, and then the dictionary D can be fixed while using a sparse approximation method, such as the OMP method, to generate sparse approximations of the remaining signal data of Y. FIG. 4 shows a flow diagram of an implementation of process 130 for training and denoising a subset of the difference image data and then fixing the dictionary while approximating the remaining signal data.

In FIG. 4 the process 130 can be performed using a sparse coding method such as a K-SVD method. Steps 410, 420, and 430 of process 130 generate a dictionary. For example, the signal vectors can be time-wise trajectories of length N for each pixel location in the transform-domain images, and the dictionary can include corresponding one-dimensional vectors of length N. Alternatively, the signal vectors can represent patches/blocks of pixel values of a given dimension, which are obtained from one of the transform-domain images, and the atoms of the dictionary can be patches/blocks having the same number of elements/dimensions as the signal vectors. Herein, only the one-dimensional pixel trajectories are expressly discussed. However, a person of ordinary skill in the art will recognize that the pixel trajectories can be generalized to higher dimensions.

In steps 410, 420, and 430, an initial dictionary is optimized according to common features of the subset of training signal vectors (here, the signal vectors are the one-dimensional pixel trajectories of length N). In certain alternative implementations, steps 410, 420, and 430 can be omitted, and a designed dictionary can be used instead of a learned dictionary. Regardless of whether a designed dictionary or a learned dictionary is used, the dictionary can be over-complete to facilitate sparse approximations.

In step 420, the subset of patches used to train the dictionary is downsampled to reduce computational requirements. Step 410 and step 430 can be omitted in certain implementations in which the dictionary D is generated without upsampling or downsampling.

In step 420, a dictionary is trained using the downsampled values of signal vectors, e.g., a subset of the pixel trajectories. In certain implementations, the dictionary is generated using a K-SVD method to solve the joint dictionary estimation and image denoising problem $$\min_{D,X}\left\{\sum_i \|Dx_i - y_i\|^2 + |x_i|_0\right\}$$

wherein i is the index of pixel trajectories, and D is the dictionary of the basis functions. In practice, the dictionary D can be trained using a small subset of pixel trajectories, after which the dictionary D is fixed and the above expression is optimized to find the transform coefficients $X_i$ that minimizes the equation. These transform coefficients are the sparse approximation to the respective pixel trajectories. The denoised transform-domain images are then represented by these sparse approximations.

In step 430, the atoms of the dictionary are upsampled to match the length of signal vectors from the transform-domain images (i.e., the pixel trajectories). The denoised training subset can also be upsampled. The upsampling can include interpolating using, e.g., linear, quadratic, cubic, or spline interpolation methods, for example. In certain implementations, additional optimization of the upsampled denoised training subset can be performed after the dictionary has been upsampled.

After step 430, the dictionary is fixed and step 440 generates sparse approximations to the remaining pixel trajectories by solving $$\min_X\left\{\sum_i \|Dx_i - y_i\|^2 + |x_i|_0\right\}.$$

Alternatively, sparse approximations to the pixel trajectories can be generated using a matching pursuit (MP) method or an orthogonal matching pursuit (OMP) method.

In certain implementations, a matching pursuit methods generates a sparse approximation of the signal vector y(t) by finding projections of multidimensional data onto an over-complete dictionary D, such that $$y(t) = \sum_{n=1}^{ND} x[n]\alpha_n(t) + R_{ND}(t)$$

wherein $R_{ND}(t)$ is the remainder, ND is the number of atoms in the dictionary used in the approximation, n is the index of the atoms $\alpha_n(t)$, and x[n] is the $n^{th}$ coefficient of the approximation. Given a fixed dictionary, matching pursuit will first find the atom that has the largest inner product with the signal vector (i.e., the first atom is $\alpha_1(t) \in D$ that maximizes the inner product $|\langle y(t), \alpha_1(t)\rangle|$), and the coefficient for the first atom is given by $x[1]=\langle y(t),\alpha_1(t)\rangle$. Next, the second value is the atom that has the largest inner product with the first reminder (i.e., the second atom is $\alpha_2(t) \in D$ that maximizes the inner product $|\langle R_1(t),\alpha_2(t)\rangle|$), and $x[2]=\langle R_1(t),\alpha_2(t)\rangle$). Thus, the matching pursuit method continues with each atom being chosen such that $\alpha_n(t) \in D$ that maximizes the inner product $|\langle R_{n-1}(t), \alpha_n(t)\rangle|$, $x[n]=\langle R_{n-1}(t),\alpha_n(t)\rangle$, and $$R_n(t) = y(t) - \sum_{i=1}^{n-1} x[i]\alpha_i(t)$$

until the remainder satisfies a convergence criterion such as $\|R_n(t)\| < \text{ò}$.

In certain implementations, an orthogonal matching pursuit (OMP) method, which is an extension of matching pursuit (MP) method, can be used to generate the approximation to the signal vector. A difference between the OMP method and the MP method is that, in the OMP method, after the selection of each atom in the approximation, all the coefficients extracted so far are updated, by computing the orthogonal projection of the signal vector onto the set of atoms selected so far. This additional step in the OMP method can lead to better results at the cost of increased computation.

The OMP method approximates the sparse problem $$\min_x\{\|y(t) - Dx\|^2\} \text{ subject to } \|x\|_0 \le T_0.$$

The similarities to the sparse problem given above can be increased by replacing or combining the convergence criterion $\|R_n(t)\|<\delta$ with a sparsity constraint, such as $\|x\|_0 \leq T$. For example, the calculation of new atoms for the approximation can continue until either the convergence criterion $\|R_n(t)\|<\delta$ or a sparsity condition $n \geq T_0$ is satisfied. In certain implementations, the approximation to the signal vector can be determined using such notable extensions of the MP and OMP methods as a stagewise OMP method, a compressive sampling matching pursuit method, and a multipath matching pursuit method, for example.

Figure 6A:
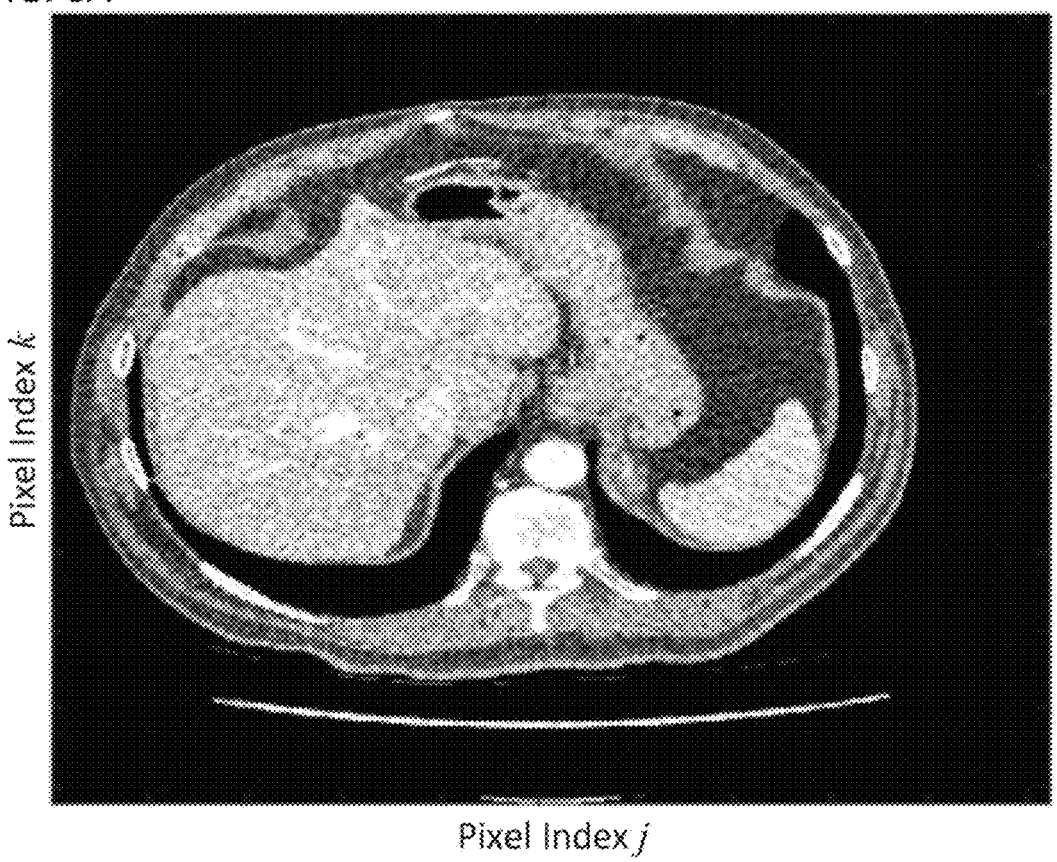
FIG. 6A shows a noisy snapshot of a dynamic image.
Figure 6B:
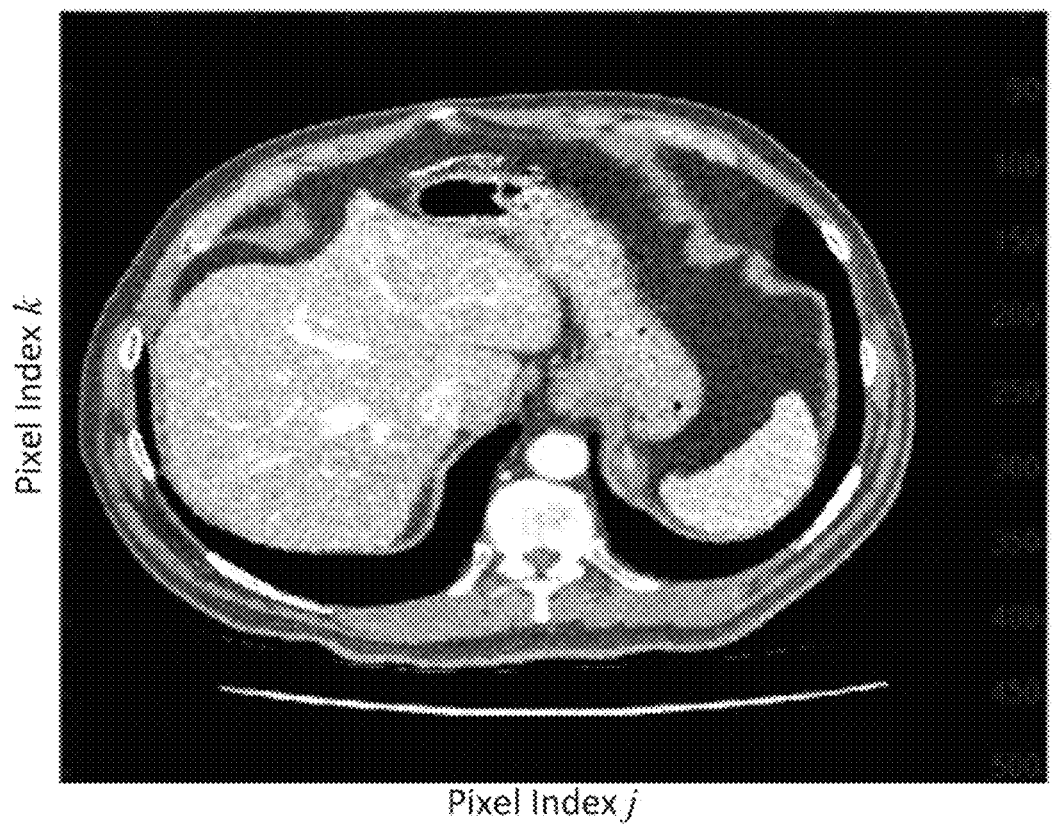
FIG. 6B shows a denoised snapshot of the dynamic image, using a K-SVD denosing method.
Figure 6C:
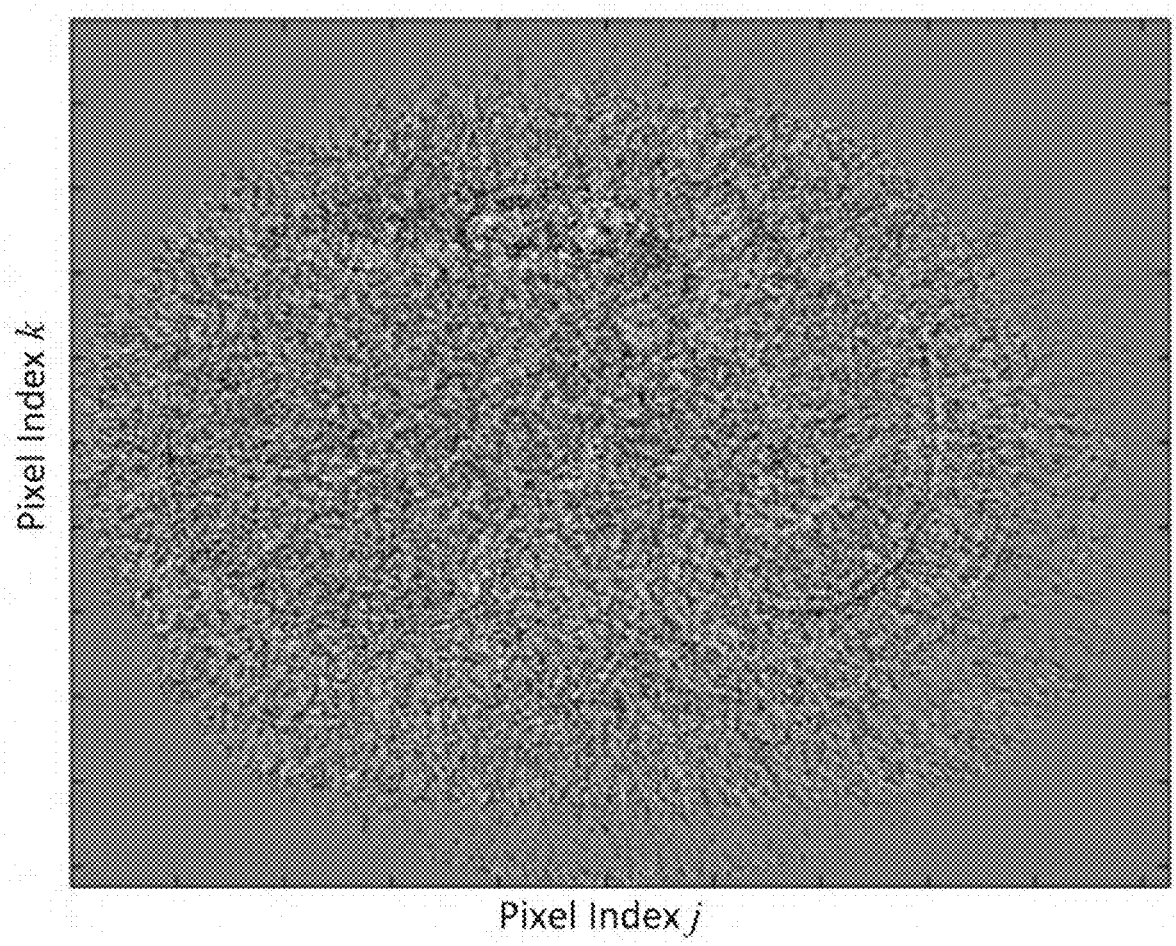
FIG. 6C shows an image representing a difference between the noisy snapshot of FIG. 6A and the denoised snapshot of FIG. 6B.

FIG. 6A shows a noisy snapshot taken from a dynamic image. FIG. 6B shows the same snapshot after it has been denoised using the K-SVD method. FIG. 6C shows a difference image between the noisy snapshot in FIG. 6A and the denoised snapshot shown in FIG. 6B.

Figure 7:
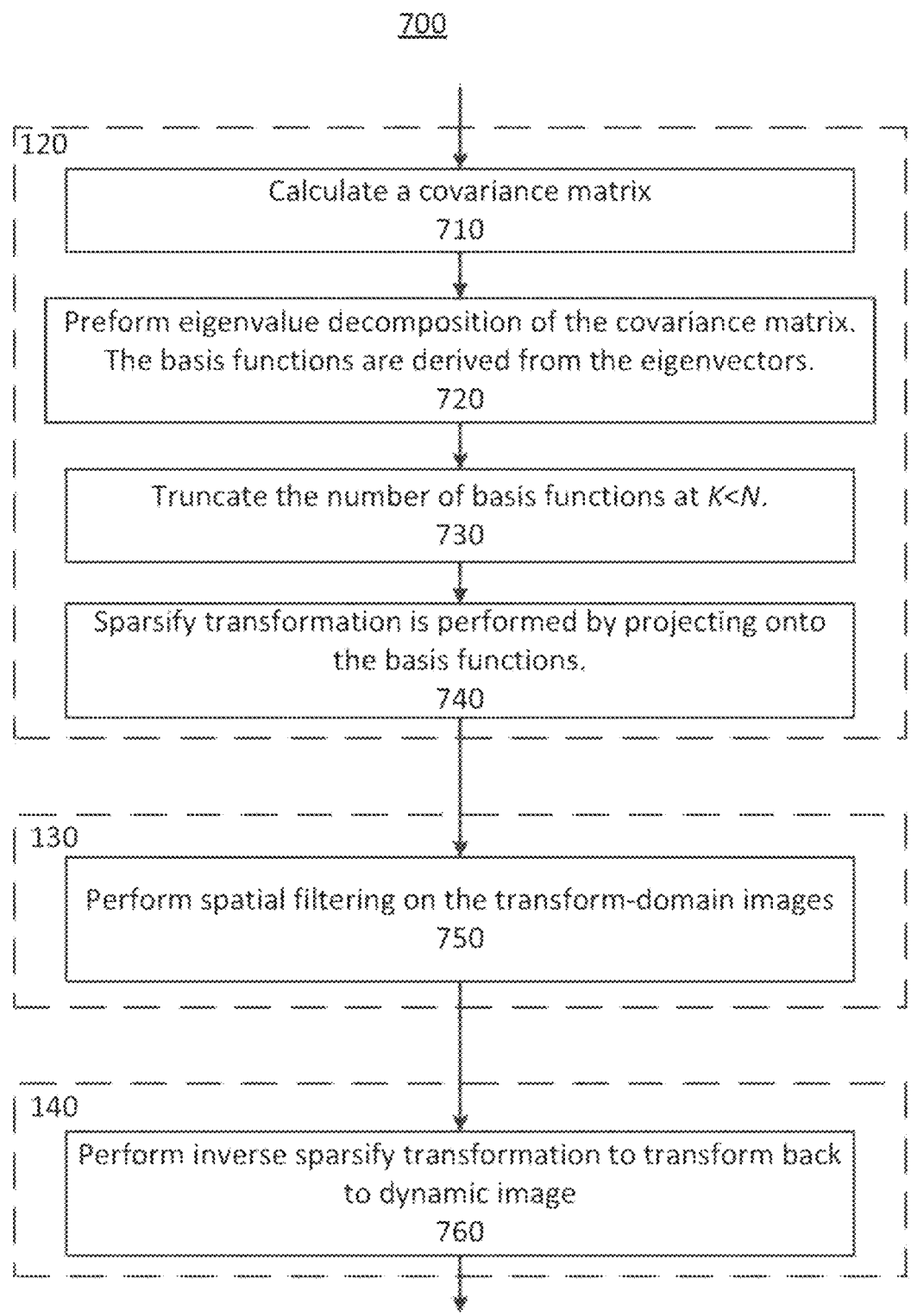
FIG. 7 shows a flowchart of a principal component analysis (PCA)-based denoising method for dynamic images.

In certain implementations, a principal component analysis (PCA)-based method can be used to perform the sparsifying transformation and denoise the dynamic image. FIG. 7 shows a flowchart of the PCA method used to implement processes 120 and 130 and step 140 of method 100.

In step 710 of method 700, a convariance matrix can be calculated using the pixel trajectories, such that the covariance matrix is given by the expression $$\sum_{nm} = \text{cov}(d_n, d_m)$$

$$\sum_{nm} = \begin{bmatrix} s_{11} & s_{12} & L & s_{1N} \\ s_{21} & s_{22} & L & s_{2N} \\ M & M & O & M \\ s_{N1} & s_{N2} & L & s_{NN} \end{bmatrix},$$

wherein the matrix elements are calculated using the expectation values of the mean subtracted products, which can be calculated as $$s_{nm} = E[(d_n - \mu_n)(d_m - \mu_m)]$$

$$= \sum_{i=1}^{I} \sum_{j=1}^{J} \sum_{l=1}^{L} (d_n(i, j, l) - \mu_n)(d_m(i, j, l) - \mu_m),$$

and the mean is given by $$\mu_n = \sum_{i=1}^{i} \sum_{j=1}^{j} d_n(i, j, l).$$

Figure 8:
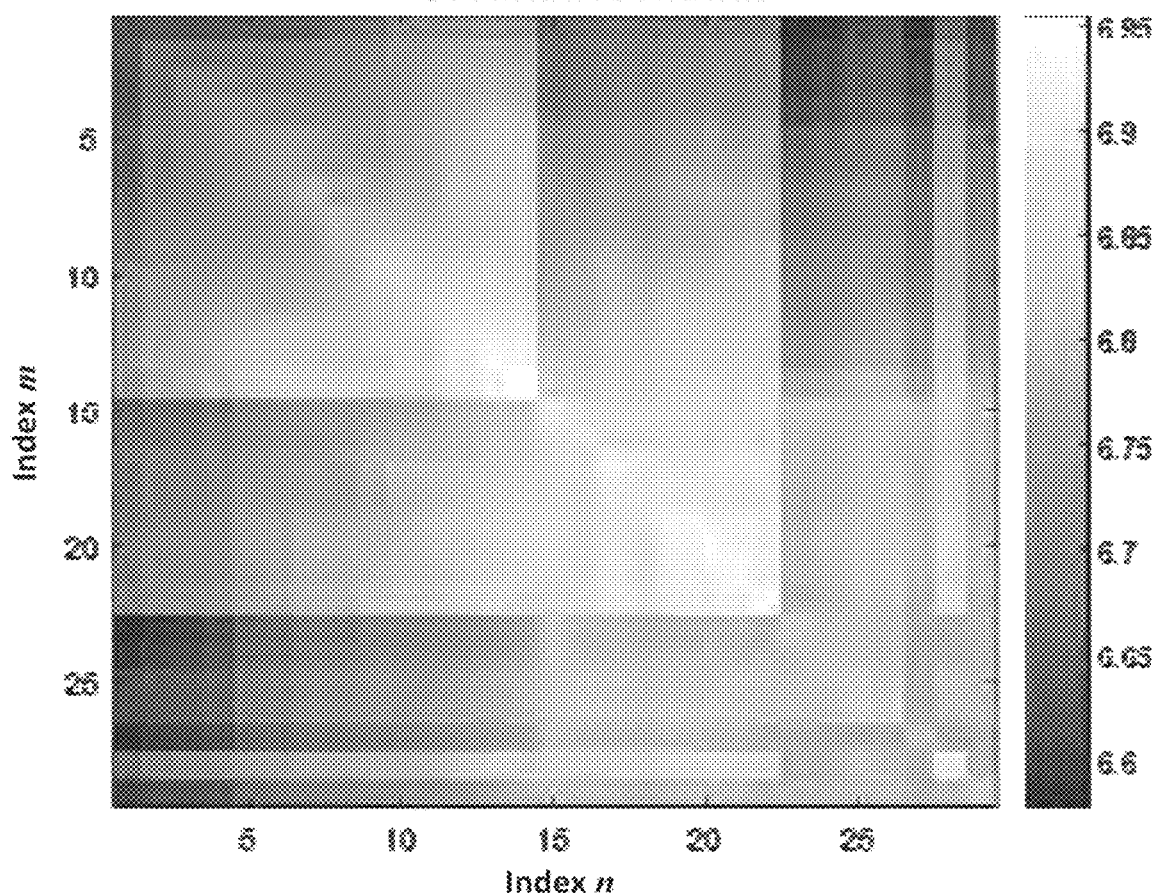
FIG. 8 shows a convariance matrix for a dynamic image.

FIG. 8 shows a covariance matrix for dynamic image having 29 snapshots. The dynamic image is the same dynamic image that was used for the K-SVD illustration shown in FIGS. 6A, 6B, and 6C.

In step 720 of method 700, an eigenvalue decomposition of the covariance matrix can be performed to generate $$\Sigma = Q \Lambda Q^{-1}.$$

In certain implementations, the eigenvalue decomposition can be performed subject to a sparsity constraint. For example, the eigenvalue decomposition can be performed subject to a constraint that either minimizes or bounds the pseudo norm $L_0$. Similarly, the eignevalue decomposition can be performed subject to a constraint that either minimizes or bounds the norm $L_1$.

Figure 9A:
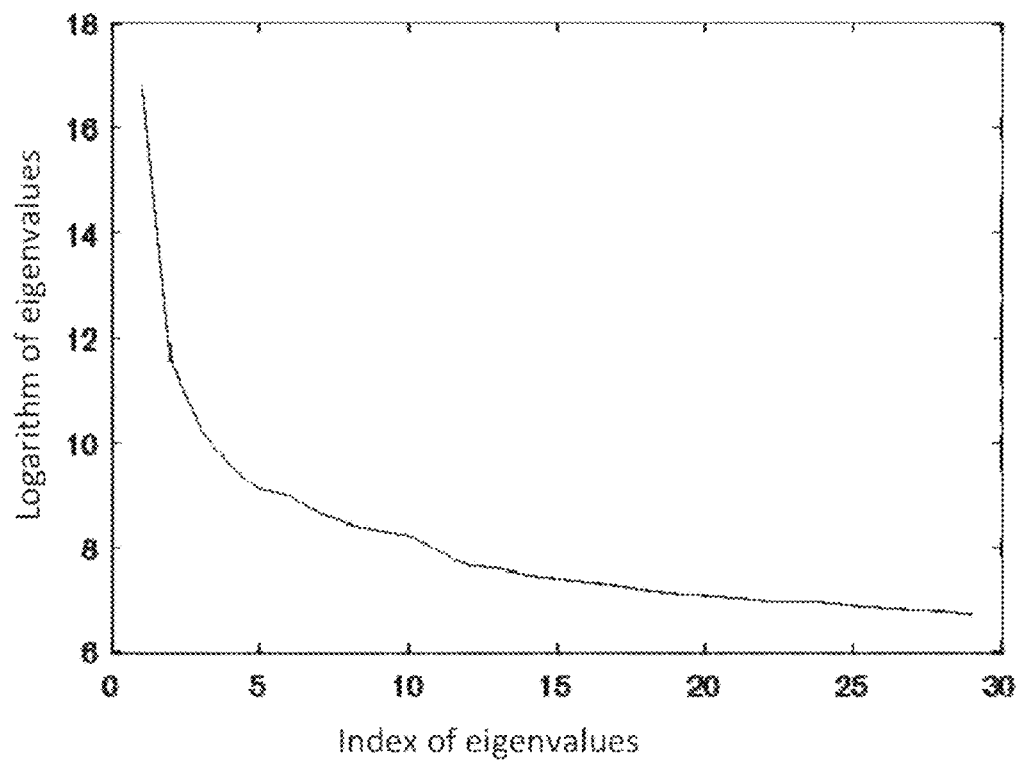
FIG. 9A shows a plot of eigenvalues of the covariance matrix.

In step 730, the number of basis functions (i.e., eigenvectors) can be truncated such that K<N. that is, the number of basis functions is less than the number of snapshots in the dynamic image. FIG. 9A shows a plot of the logarithm of the eigenvalues corresponding to the convariance matrix shown in FIG. 8. As can be seen in FIG. 9A, a few of the eigenvalues are large, and the remaining eigenvalues are much smaller. The kinetic signals are represented by the eigenvectors corresponding to the largest eigenvalues, and the eigenvectors corresponding to the smallest eigenvalues predominantly represent noise. Thus, the eigenvectors corresponding to the smallest eigenvalues can be thrown away without significant adverse effects to the approximation of the kinetic signal, while eliminating a significant fraction of the noise.

This truncation of the basis function can be achieved by sorting the eigenvalues of the diagonal matrix $\Lambda$ from largest to smallest with concomitant reorganization of the Q and $Q^{-1}$ matrices, and the columns vectors $\vec{q}_k$ of the matrix Q (which are equal to the Hermitian conjugates of the row vectors of the $Q^{-1}$ matrix) are the basis functions of the sparsifying transformation (e.g., the synthesizing transformation matrix is B=Q and the sparsifying transformation is $S=Q^{-1}$). The Q and $Q^{-1}$ matrices can be modified to create Q' and $Q'^{-1}$ by setting to zero all eigenvectors except those corresponding to the K largest eigenvalues. Thus, the inverse sparsifying transformation becomes B=Q', and the sparsifying transformation becomes $S=Q'^{-1}$. In certain implementations, the value of K can be determined as being a predefined ratio of the number of transform-domain images N. In certain other implementations, K can be determined using a predefined criteria based on the number of eigenvalues whose ratio to the largest eigenvalue does not fall below a predefined value.

Figure 9B:
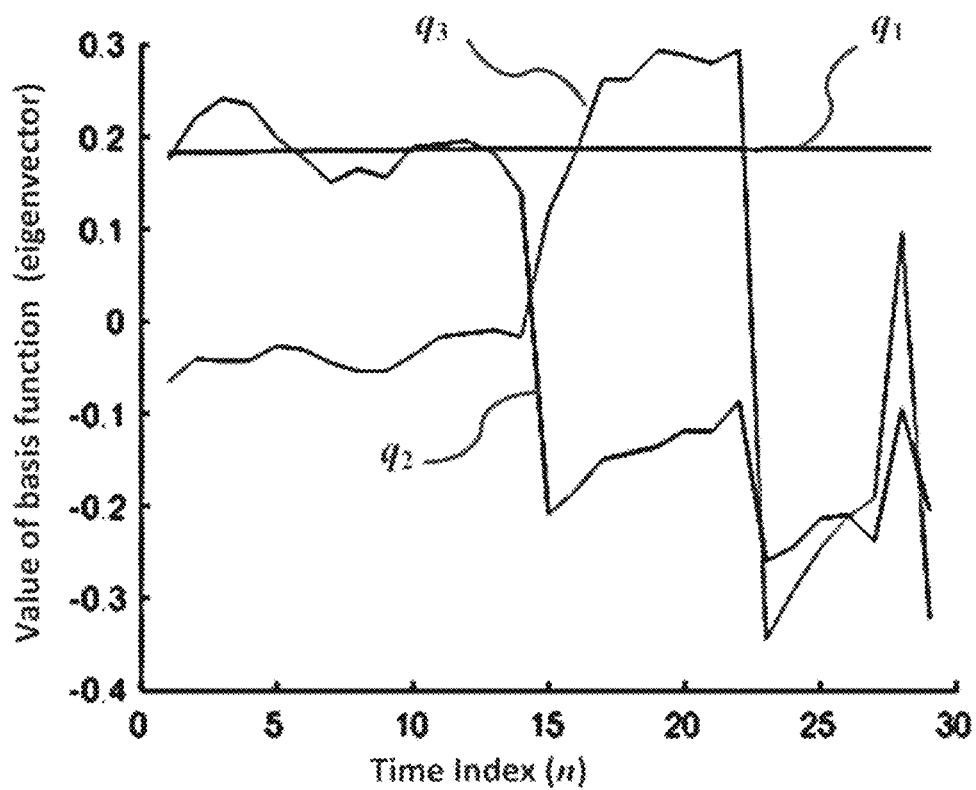
FIG. 9B shows a plot of three eigenvectors corresponding to the three largest eigenvalues of the covariance matrix.
Figure 9C:
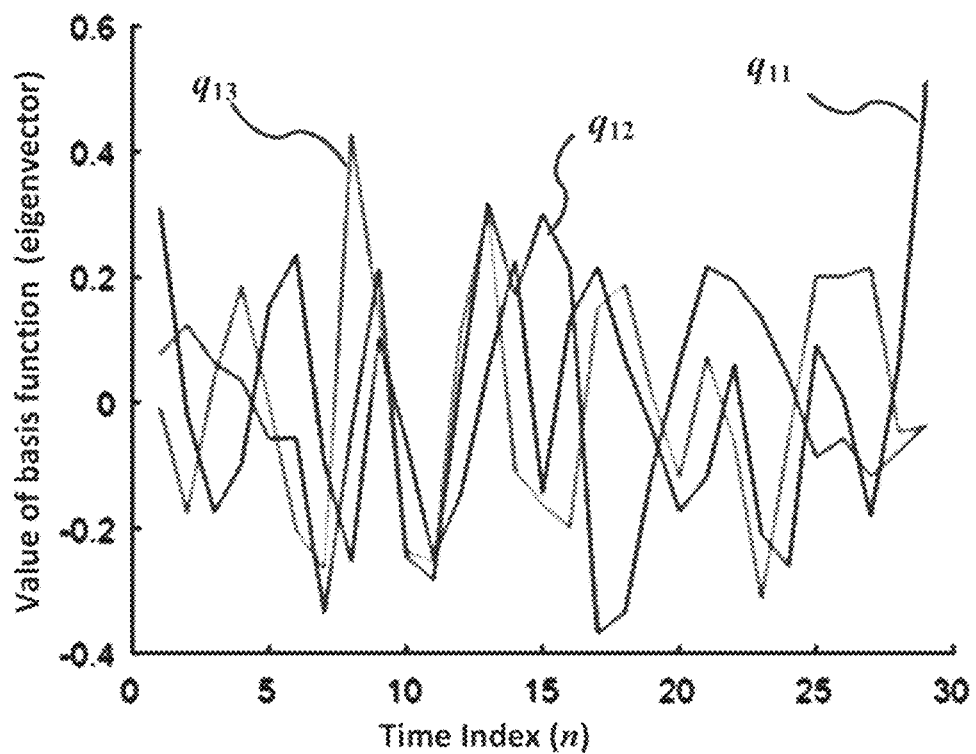
FIG. 9C shows a plot of three eigenvectors corresponding to the $11^{th}$, $12^{th}$, and $13^{th}$ largest eigenvalues of the covariance matrix.
Figure 9D:
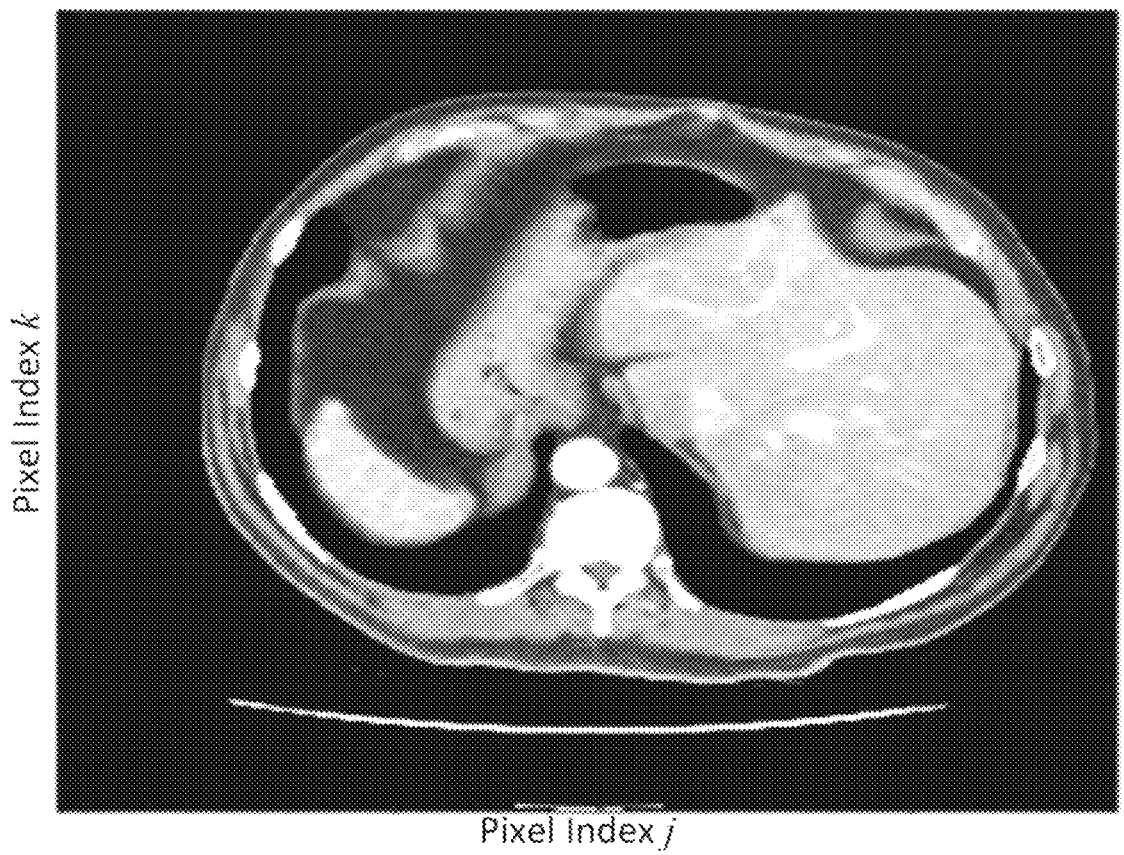
FIG. 9D shows a transform-domain image obtained by projecting respective pixel trajectories of the dynamic image onto the eigenvector corresponding to the largest eigenvalue of the covariance matrix.
Figure 9E:
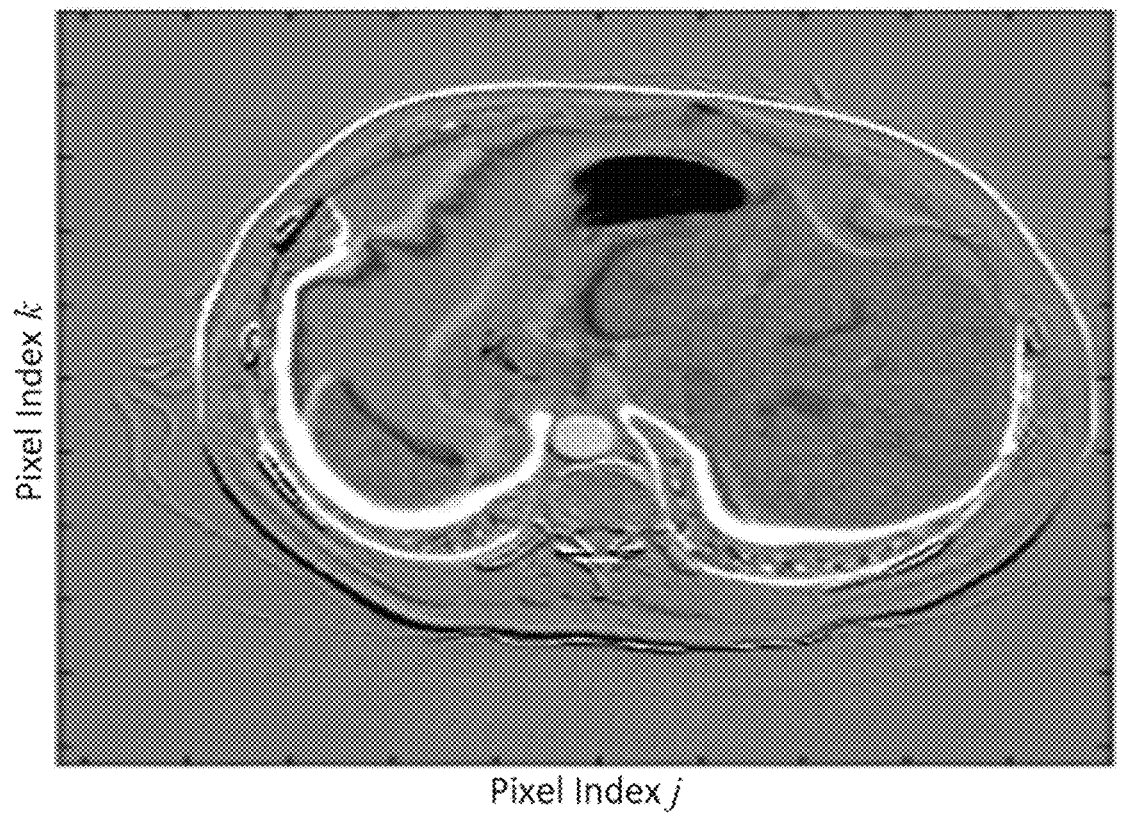
FIG. 9E shows a transform-domain image obtained by projecting respective pixel trajectories of the dynamic image onto the eigenvector corresponding to the $2^{nd}$ largest eigenvalue of the covariance matrix.
Figure 9F:
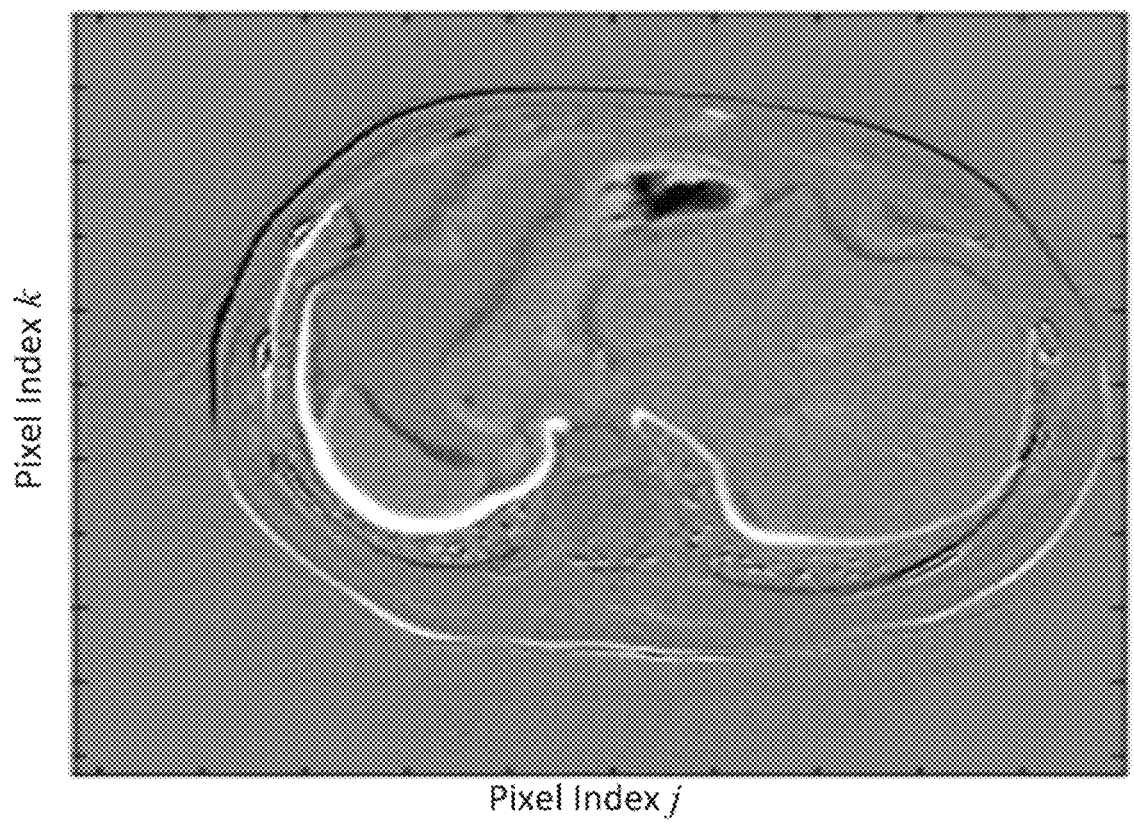
FIG. 9F shows a transform-domain image obtained by projecting respective pixel trajectories of the dynamic image onto the eigenvector corresponding to the 3$^{rd}$ largest eigenvalue of the covariance matrix.

FIG. 9B shows the eigenvectors (i.e., basis functions) corresponding to the three largest eigenvalues. The first basis function $\vec{q}_1$ is a DC signal, the second basis function $\vec{q}_2$ and the third basis function $\vec{q}_3$ have sharp transitions at time indices 14 and 23, which is consistent with patient motion and kinetic change in this data. FIG. 9C shows the eigenvectors (i.e., basis functions) corresponding to the $11^{th}$, $12^{th}$, and $13^{th}$ largest eigenvalues. These basis functions appear to have a more random structure, which is indicative of noise. FIG. 9D shows a transform-domain image generated by projecting the pixel trajectories of the dynamic image onto the first basis function $\vec{q}_1$. Each of the transform-domain images can be obtained by projecting onto the basis functions using the expression $$d_{k-1}(i, j, l) = \sum_{n=1}^{N} q_k[n] P_n(i, j, l)$$

wherein $q_k[n]$ is the $k^{th}$ coefficient of the $k^{th}$ basis function. As can be seen in FIG. 9D, the projection onto the basis function corresponding to the largest eigenvalue is the aggregate image, which contains most of the anatomic information. FIGS. 9E and 9F show the transform-domain images corresponding to the second and third largest eigenvalues. These transform-domain images contain kinetic information of the dynamic image. In this case the dynamic image is for a profusion sturdy, and the second and third transform-domain images contains the contrast change due to perfusion and motion change due to breathing.

In method 700, step 740 transforms the dynamic image onto the transform-domain images using the expression $$d_{k-1}(i, j, l) = \sum_{n=1}^{N} q_k[n] P_n(i, j, l).$$

Next, in step 750 of method 700, additional denoising can be performed. This additional denoising can be performed using the spatial-domain denoising methods previously described for process 130, including, for example, local linear filtering, local nonlinear filtering, and on-local means filtering.

As discussed above, projecting the dynamic image onto the basis functions corresponding to the K largest eigenvalues provides denoising even before performing step 750. Further, enforcing a sparsity constraint during the eigenvalue decomposition provides additional denoising by favoring those eigenvectors that represent larger localized features rather than low-level randomly distributed noise. Thus, in certain implementations, step 750 can be omitted and all of the denoising in method 100 can originate from the projection of the dynamic image onto the basis functions corresponding to the K largest eigenvalues.

Finally, the step 760 of method 700, which corresponds to step 140 of method 100, the transform-domain images are inverse-sparsifying transformed back to the dynamic image, which transformation is given by $$P'_n(i, j, l) = \sum_{k=1}^{K} q_k[n] d_{k-1}(i, j, l),$$

wherein $P'_n(i,j,l)$ is the denoised dynamic image. When step 750 is omitted, the PCA based method can be expressed simply as $$P'_n = Q'Q'^{-1} P_n.$$

Figure 9G:
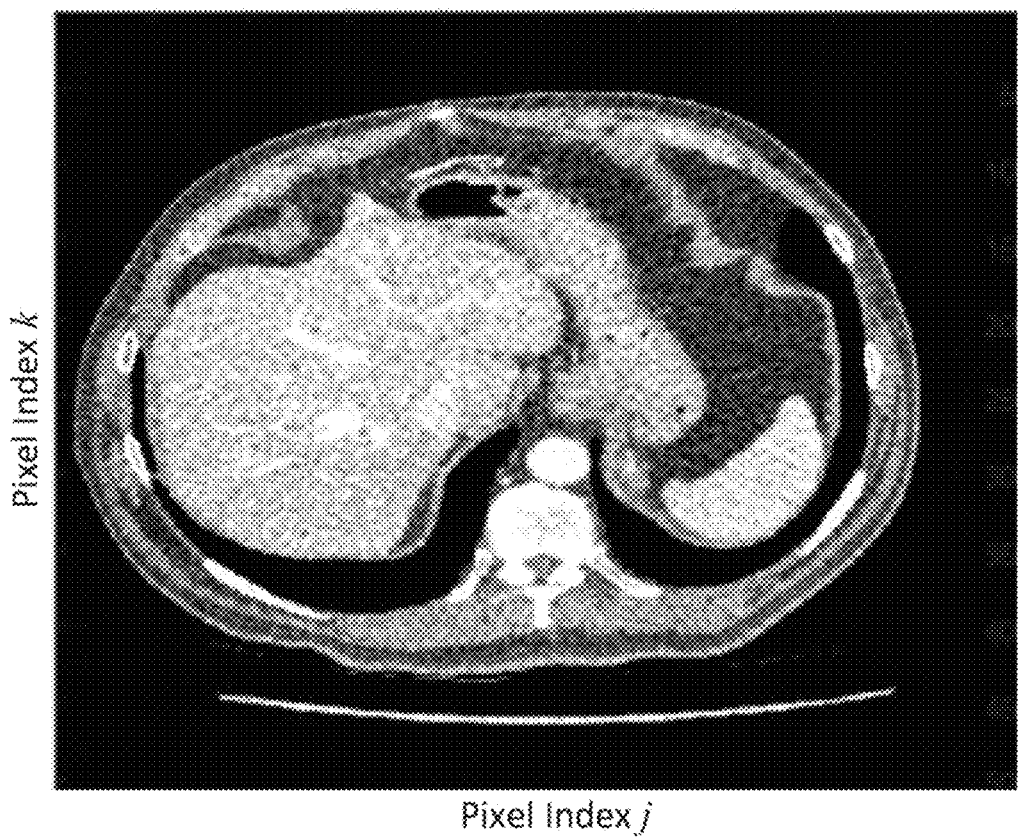
FIG. 9G shows a noisy snapshot of a dynamic image.
Figure 9H:
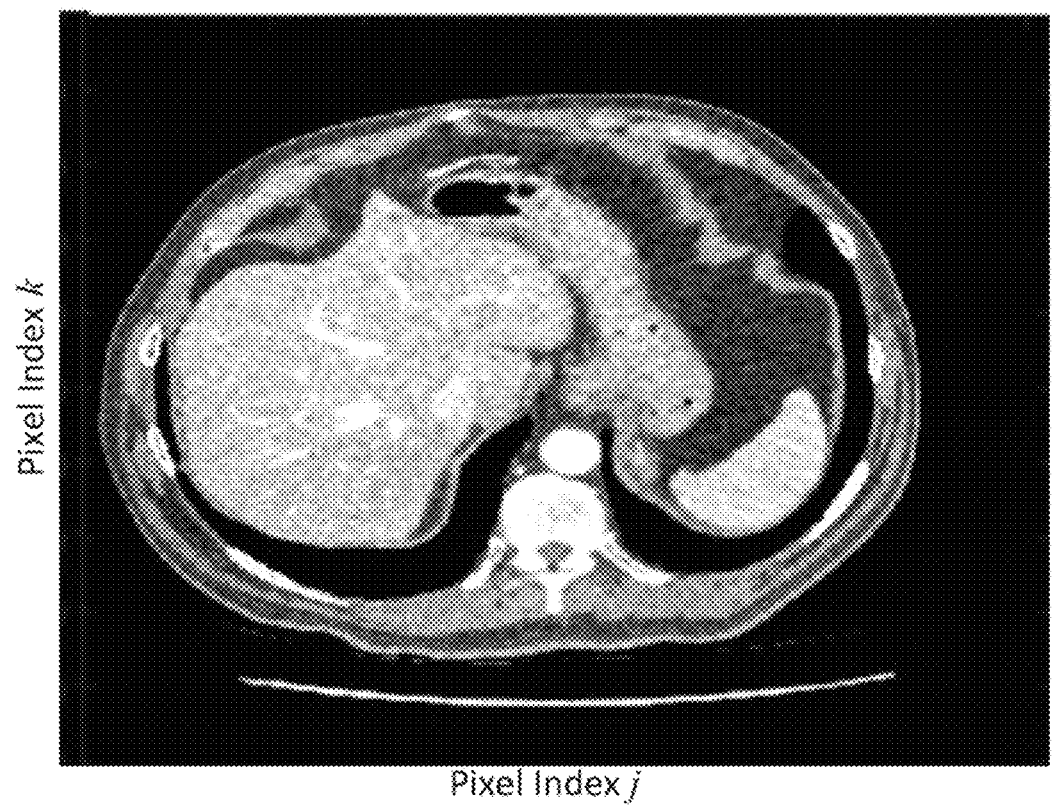
FIG. 9H shows a snapshot of the dynamic image that was denoised using the PCA-based denoising method.
Figure 9I:
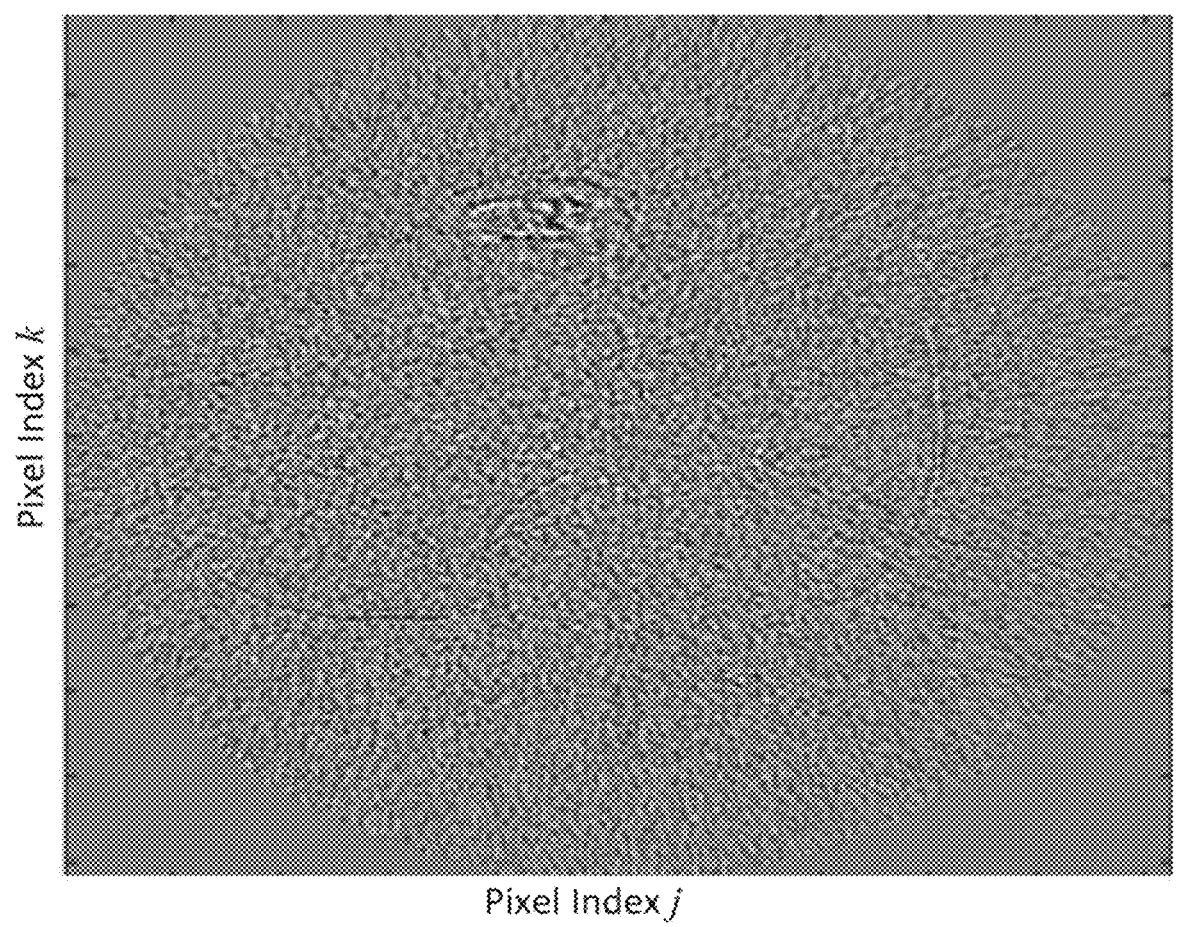
FIG. 9I shows an image representing a difference between the noisy snapshot of FIG. 9G and the denoised snapshot of FIG. 9H.

FIG. 9G shows a noisy snapshot taken from a dynamic image. FIG. 9H shows the same snapshot after it has been denoised using the PCA-based method 700. FIG. 9I shows a difference image between the noisy snapshot in FIG. 9G and the denoised snapshot shown in FIG. 9H. Compared to the local dynamic denoising method, the PCA-based method 700 uses the data in all time samples, and therefore can potentially further reduce the noise in the reconstructions.

Figure 10:
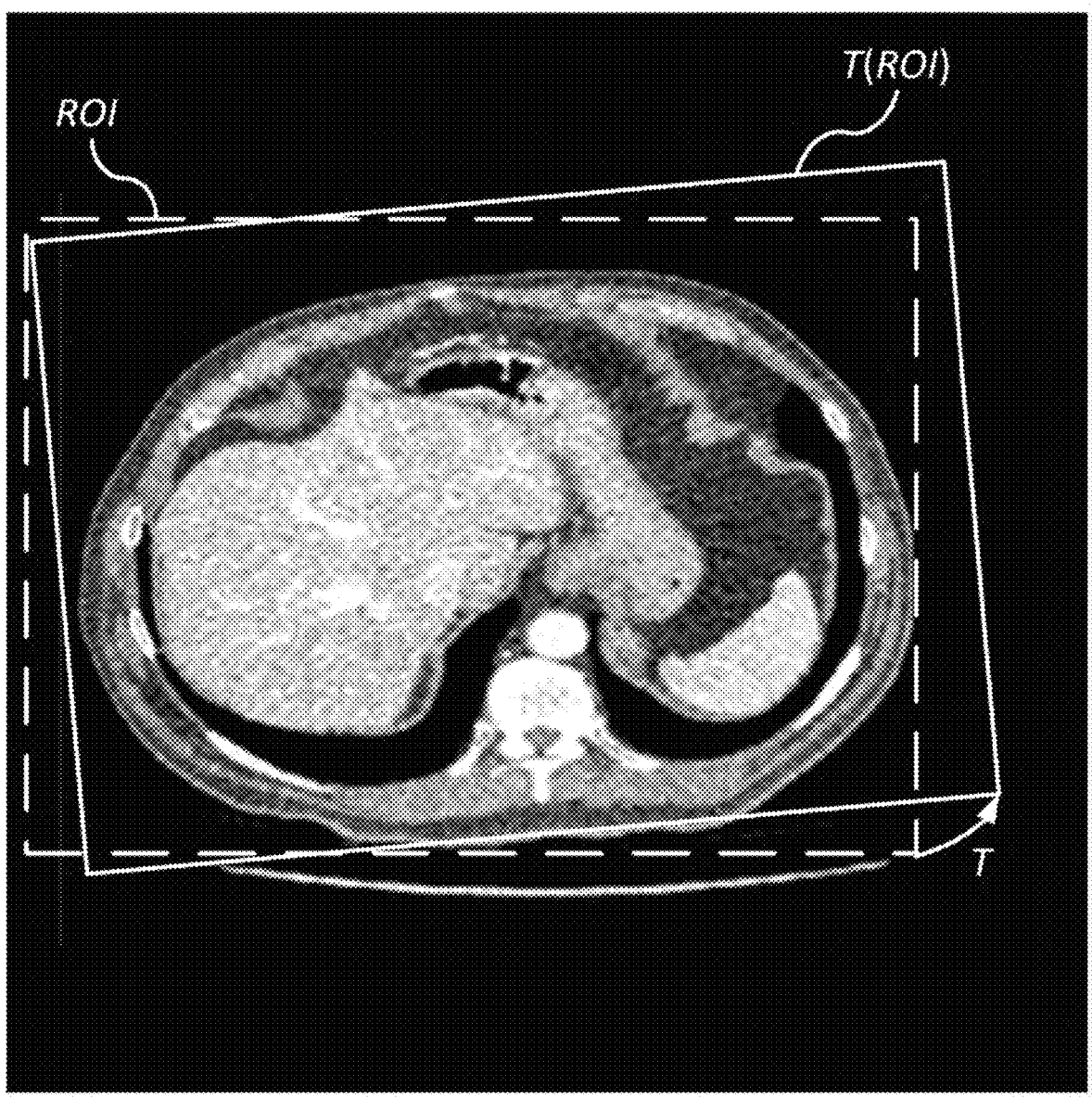
FIG. 10 illustrates a transformation T for registering a region of interest (ROI) of a snapshot of a dynamic image.

FIG. 10 illustrates an example of registering an image using a spatial transformation (e.g., a rotation and a translation) to maximize an image correlation within a region of interest (ROI). The correlation can be between time-adjacent snapshots of a dynamic image. The ROIs are pre-defined searching regions in a first snapshot and a second snapshot. FIG. 10 illustrates an example of the ROI of the second snapshot. The ROI of the first snapshot is the same size as the ROI of the second snapshot. However, a patient's movement between the first snapshot and the second snapshot can result in differences (e.g., lateral offsets and rotation offsets) between the positions of the features within the two snapshots. Therefore, a cross-correlation can be performed while transforming one ROI with respect to the other ROI to find a maximum cross-correlation value when the transformation causes the two snapshots to be aligned.

Figure 11A:
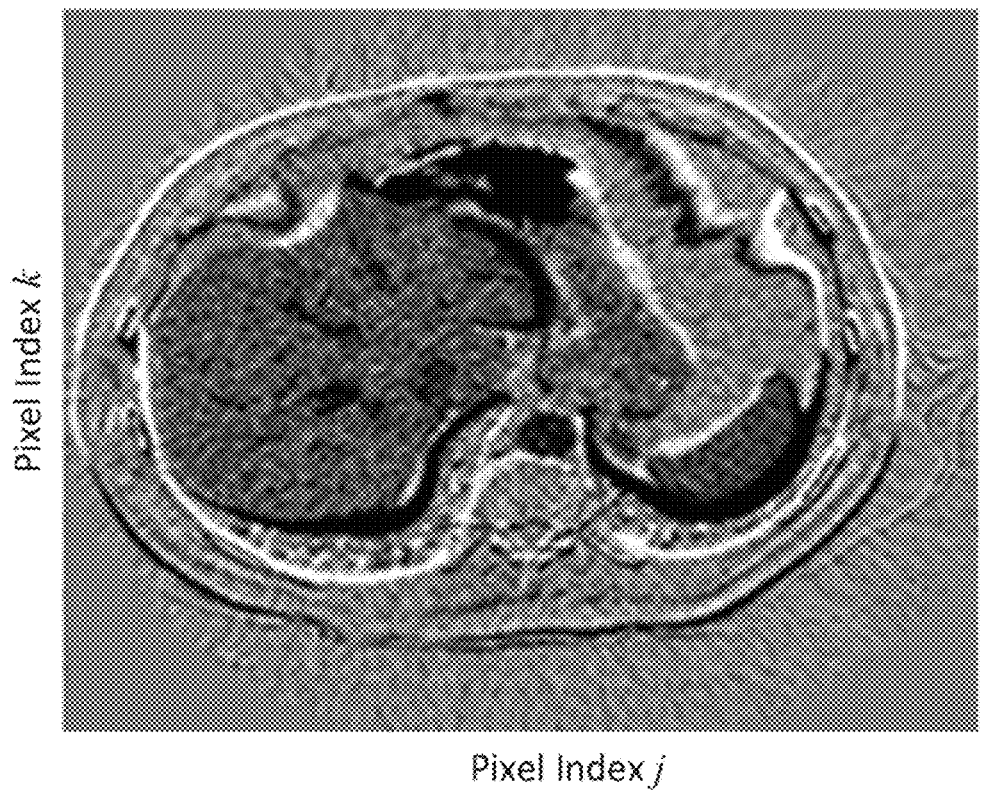
FIG. 11A shows a transform-domain image for a sparsifying transformation when the snapshots of the dynamic image are not registered.
Figure 11B:
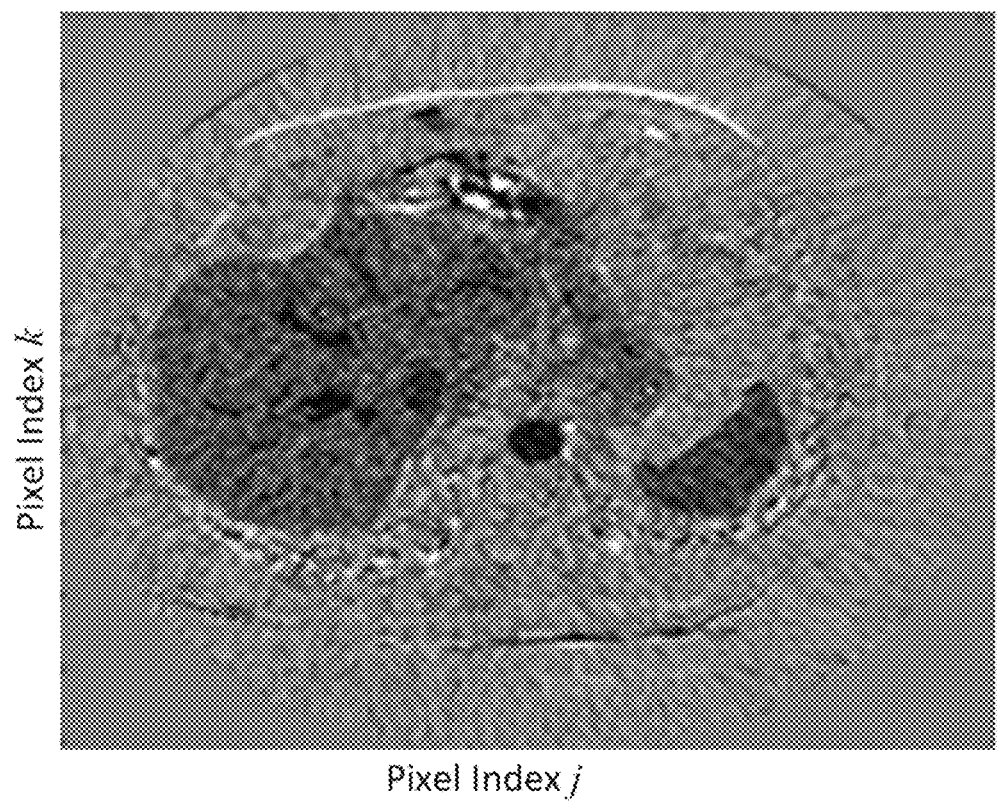
FIG. 11B shows a transform-domain image for a sparsifying transformation when the snapshots of the dynamic image are registered.
Figure 11C:
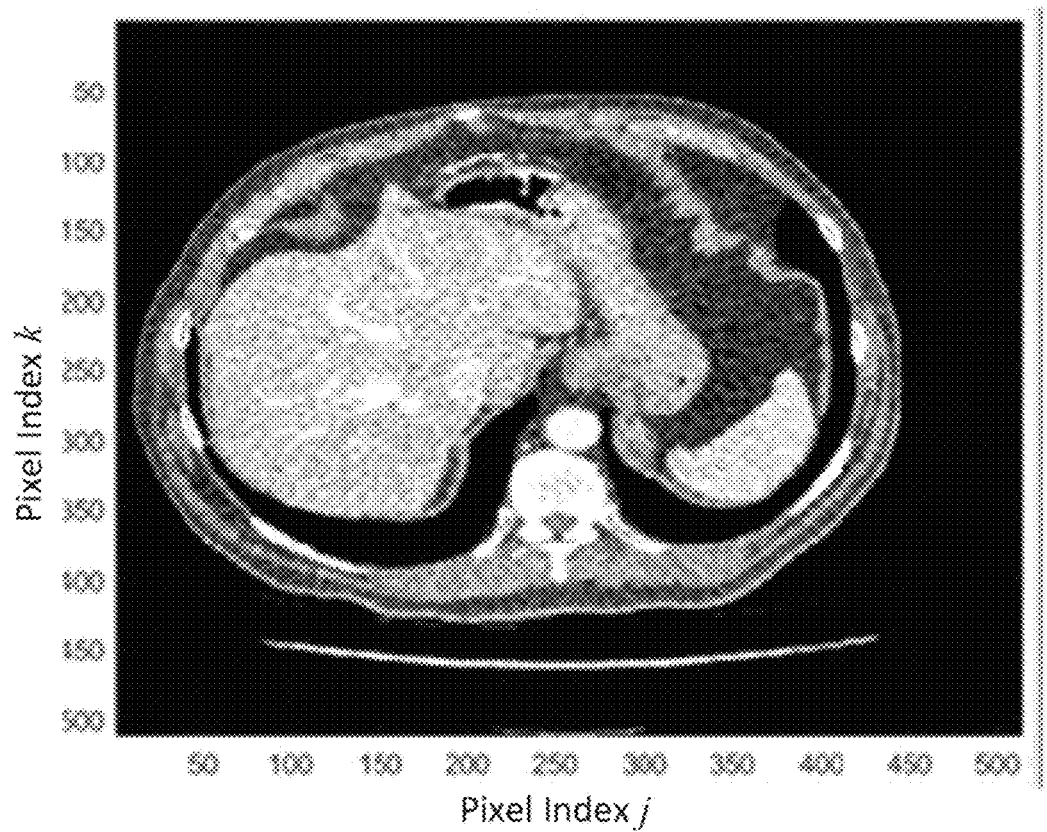
FIG. 11C shows a noisy snapshot of the dynamic image.
Figure 11D:
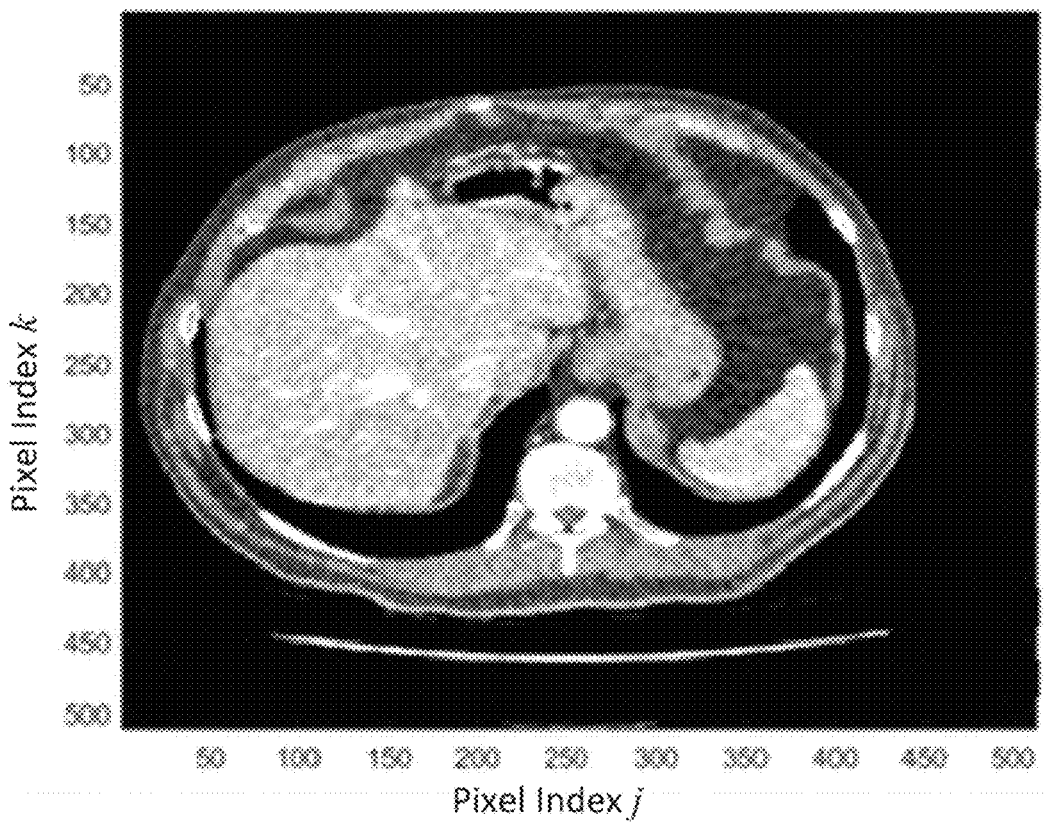
FIG. 11D shows a denoised snapshot of the dynamic image without registration.
Figure 11E:
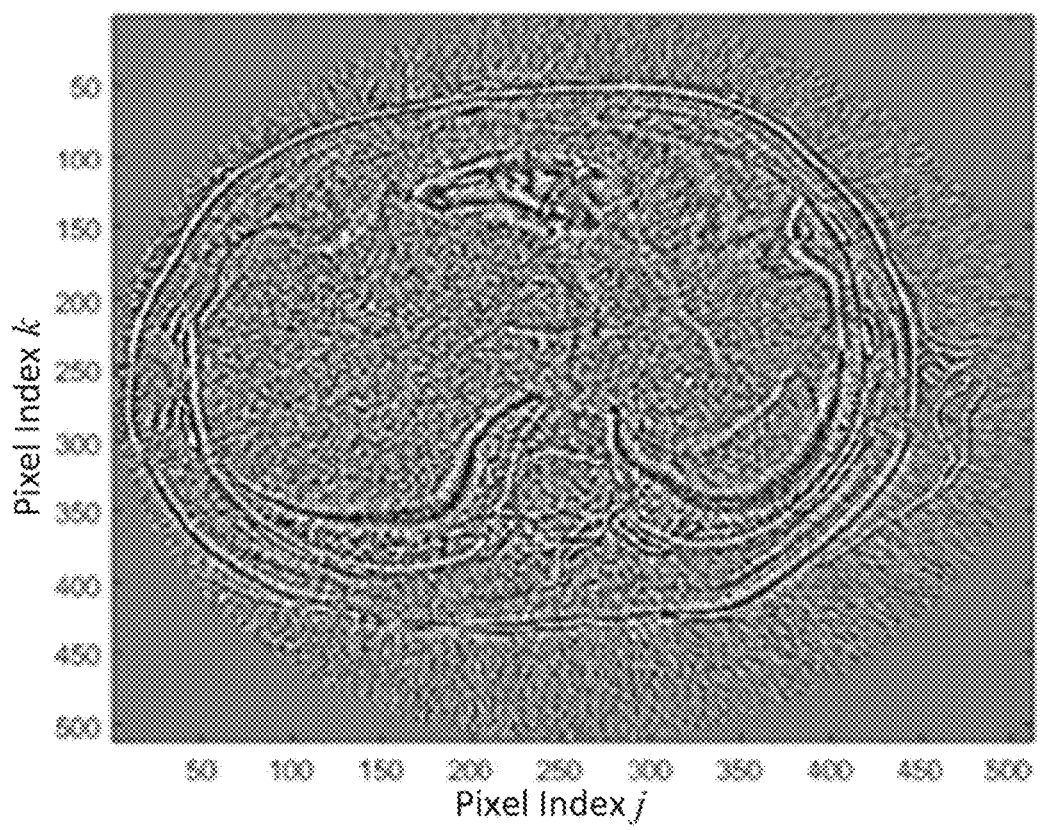
FIG. 11E shows an image of a difference between the noisy snapshot of FIG. 11C and the denoised snapshot without registration of FIG. 11D.
Figure 11F:
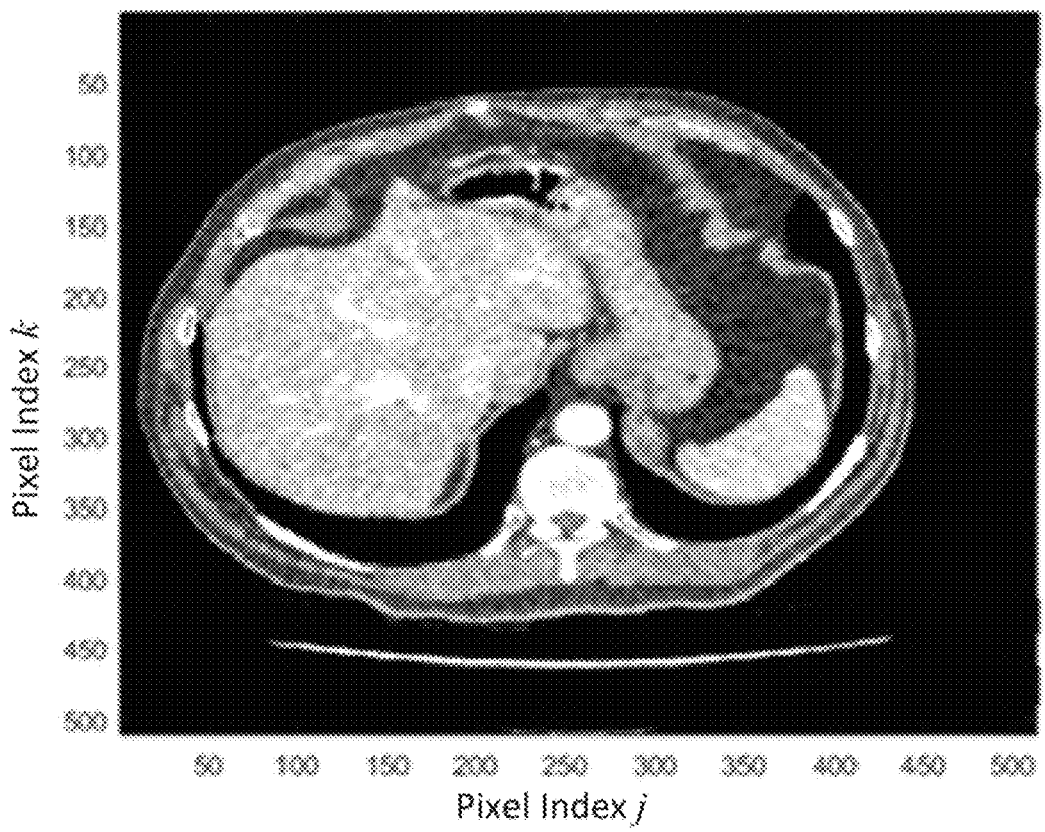
FIG. 11F shows a denoised snapshot of the dynamic image with registration.
Figure 11G:
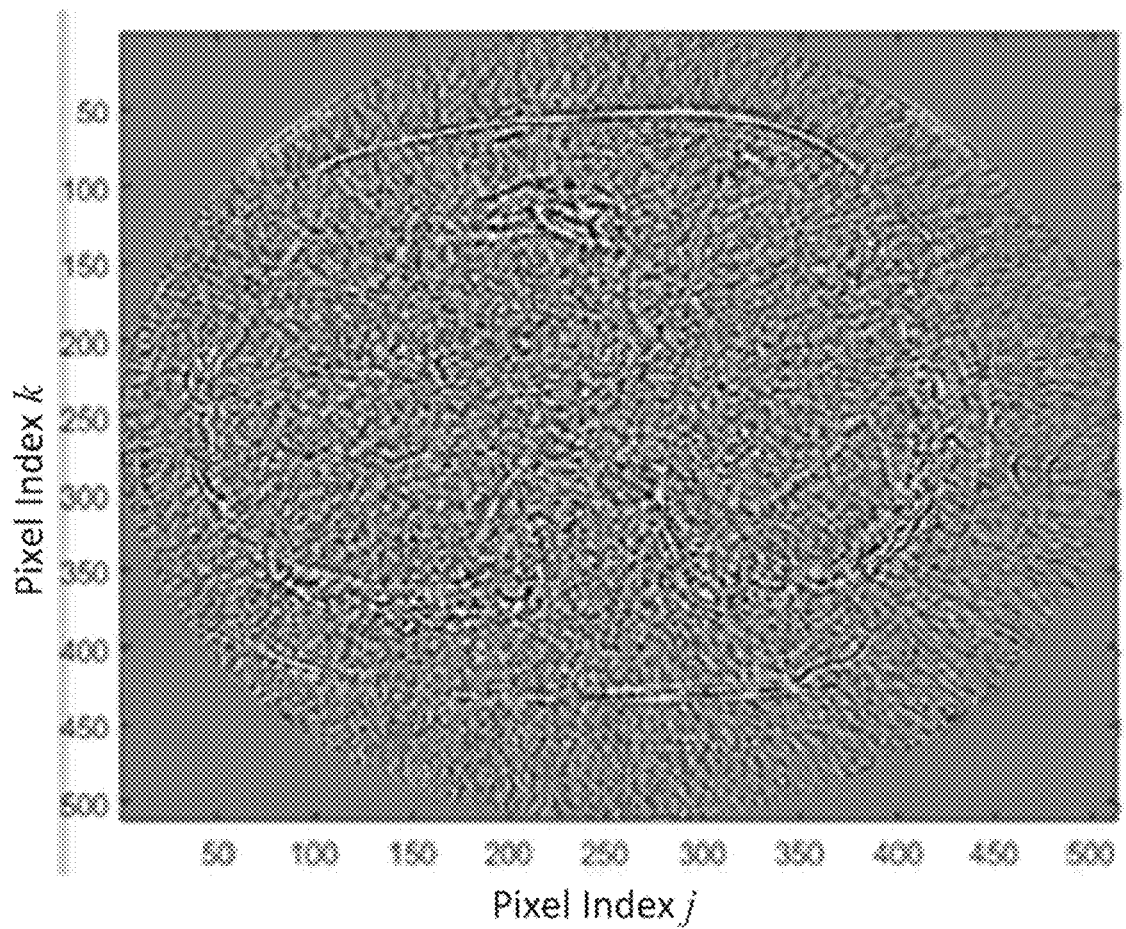
FIG. 11G shows an image of a difference between a registered version of the noisy snapshot of FIG. 11C and the denoised snapshot with registration of FIG. 11F.

FIG. 11A shows a transform-domain image without registration and FIG. 11B shows a transform-domain image with registration. Without registration, most of the features in the transform-domain images shown in FIG. 11A are due to movements of the patient rather than changes arising from profusion. FIG. 11C shows a snapshot of the dynamic image before denoising. FIG. 11D shows a snapshot of the dynamic image after denoising without registration, and FIG. 11E shows a difference between FIGS. 11C and 11D. Similarly, FIG. 11F shows a snapshot of the dynamic image after denoising with registration, and FIG. 11G shows an image of the difference between FIGS. 11C and 11F. Comparing FIG. 11E to FIG. 11G, it can be seen that registration advantageously improves the image quality of the denoised image.

Registration can be performed by finding the maximum value of the cross-correlation function between the first snapshot and the second snapshot, wherein the cross-correlation function can include both translations and rotations. Alternatively, registration can be performed by solving for the argument (i.e., transformation) that maximizes an overlap integral between the first snapshot and the second snapshot, wherein the argument of the transformation operator includes both translations and rotations.

Next, a method of the registration of the first snapshot $P_n(u,v)$ and the corresponding second snapshot $P_{n+1}(u,v)$ is described, wherein u and v are spatial coordinates corresponding to the spatial indices (e.g., on a uniform grid $u=u^{(0)}+j\Delta u$ and $v=v^{(0)}+k\Delta v$, wherein $\Delta u$ and $\Delta v$ are the spatial separations between pixels). Here, two-dimensional snapshots, rather than three-dimensional snapshots, are considered to simplify the notation, but the generalization to three-dimensional snapshots, are considered to simplify the notation, but the generalization to three-dimensional snapshots is straightforward. Further, without loss of generality, only a single frame pair is described, but the same process can be used for each snapshot pair. The boundary-boxes ROI first snapshot can be described with reference to the top-left pixel $P_n(u_0, v_0)$ and the right-bottom pixel $P_n(u_1, v_1)$. Thus, the first snapshot in the ROI ("ROI of the first snapshot") can be expressed as $$P_{n,roi}(u',v')=P_n(u_0+u',v_0+v'), 0\leq u'\leq u_1-u_0, 0\leq v'\leq v_1-v_0.$$

Similarly, the corresponding second snapshot in ROI ("ROI of the second snapshot")) can be expressed as $$P_{n+1,roi}(u',v')=P_{n+1}(u_0+u',v_0+v'), 0\leq u'\leq u_1-u_0, 0\leq v'\leq v_1-v_0.$$

The ROI of the second snapshot can be transformed by the transformation operator T, as shown in FIG. 10, and the pixel values within the ROI of the transformed second snapshot can be interpolated and mapped onto a grid matching the first snapshot in order to calculate the overlap integral. A rigid transformation (defined as rotation and translation) of the ROI in the second snapshot can be defined as $$(u_{0,T}, v_{0,T})=T(j_0, v_0)=R_\theta(u_0, v_0)+(\Delta u, \Delta v) \text{ and}$$

$$(u_{1,T}, v_{1,T})=T(u_1, v_1)=R_\theta(u_1, v_1)+(\Delta u, \Delta v); \text{ and}$$

the second snapshot in the transformed ROI can be expressed as $$P_{C,roi}(u',v',T)=P_C((u_{0,T}, v_{0,T})+u'\vec{u}+v'\vec{v}), 0\leq u'\leq u_1-u_0, 0\leq v'\leq v_1-v_0,$$

wherein $\vec{u}$ and $\vec{v}$ are normalized vectors along transformed u and v directions. The transformation of the ROI image in a second snapshot can be implemented by image interpolation to map the second snapshot onto a grid with a matching size ($u_1-u_0$, $v_1-v_0$) with the ROI of the first snapshot. In one implementation, the cross-correlation between the ROI of the first snapshot and the transformed ROI of second snapshot can be expressed by $$CC(T) = \sum_{u'=0}^{u_1-u_0} \sum_{v'=0}^{v_1-v_0} \frac{(P_{n,roi}(u', v') - \overline{P}_{n,roi})(P_{n+1,roi}(u', v', T) - \overline{P}_{n+1,roi})}{(u_1-u_0)(v_1-v_0)},$$

wherein $\overline{P}_{n,\,roi}$ and $\overline{P}_{n+1,\,roi}$ are the average in ROI of the first snapshot $P_{n,\,roi}(n', v')$ and the average in ROI of transformed second snapshot $P_{n+1,\,roi}(u', v', T)$, respectively. Registration occurs by finding the transformation that maximizes the above cross-correlation. For example, an optimal transformation maximizing the cross-correlation between the ROIs of the first and second snapshots can be obtained using a brute force search within a pre-defined searching region so that a transformation argument is obtained that maximizes the cross-correlation as expressed by $$\overline{T} = \underset{T}{\operatorname{argmax}}\{CC(T)\}$$

The registered contrast frame then becomes $$P_{n+1,reg}(u,v) = P_{n+1}(\overline{T}(u,v)).$$

The registered contrast frame can be obtained by interpolation of the second snapshot and mapping onto a grid corresponding to the transformed ROI. In one implementation, a stochastic search method, such as a genetic algorithm, can be used rather than the brute force search. In one implementation, a gradient search method can be used rather than the brute force search. Any known search method can be used to optimize the transformation argument of the cross-correlation function.

The registration process can be performed repeatedly to register each snapshot to an initial snapshot. Alternatively, each snapshot could be registered to the snapshot immediately preceding it in time, starting with the first snapshots. This alternative method could also use a quality control check to prevent a propagation of transformation errors whereby small errors in early registrations of the first snapshots are carried forward and added to in the registration of later snapshots. In contrast, when the subsequent snapshots are each registered to the initial snapshot, the propagation of errors problems can be avoided.

Figure 12:
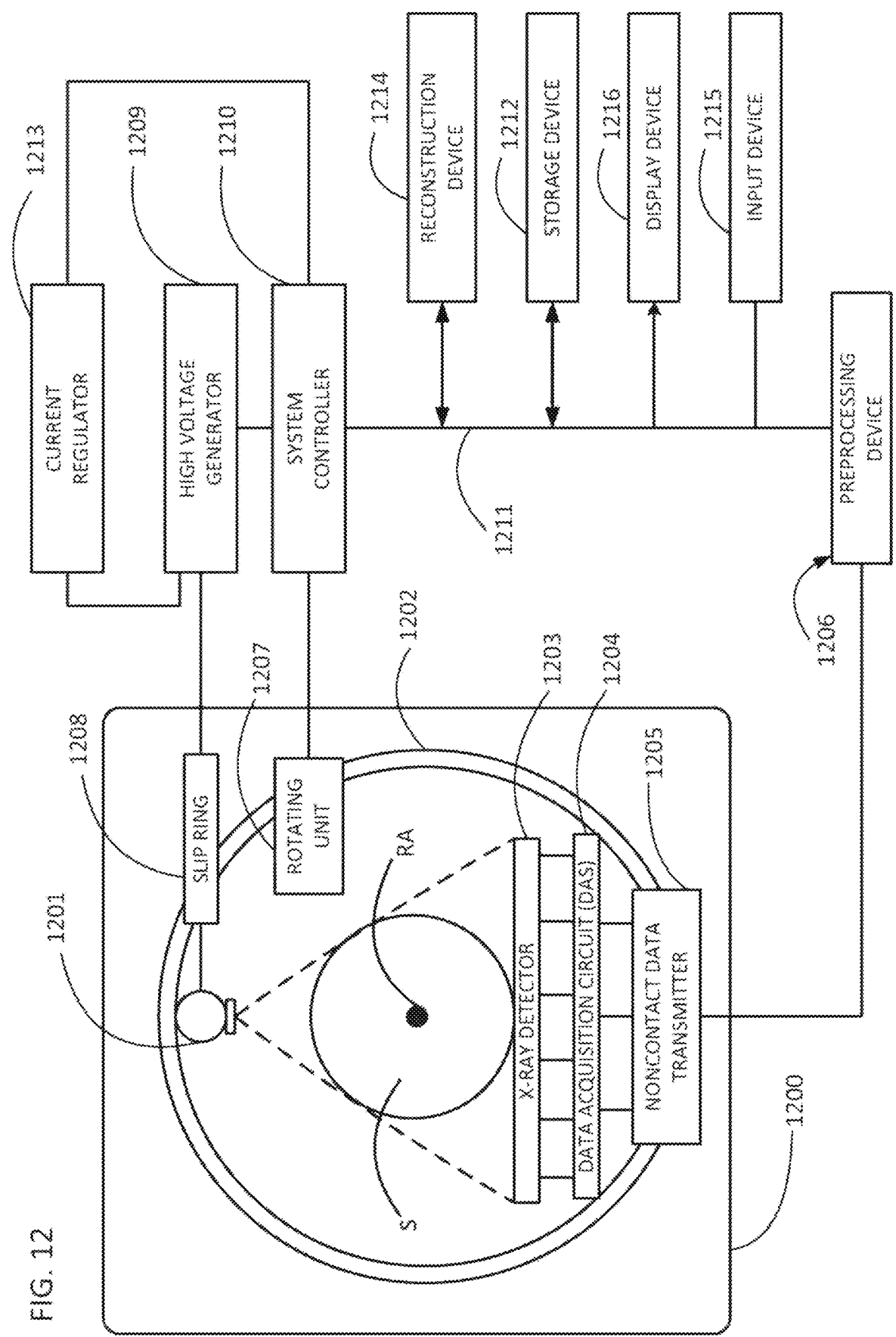
FIG. 12 illustrates a CT scanner.

FIG. 12 illustrates an implementation of the radiography gantry included in a CT apparatus or scanner. As shown in FIG. 12, a radiography gantry 1200 is illustrated from a side view and further includes an X-ray tube 1201, an annular frame 1202 is illustrated from a side view and further includes an X-ray tube 1201, an annular frame 1202, and a multi-row or two-dimensional-array-type X-ray detector 1203. The X-ray tube 1201 and X-ray detector 1203 are diametrically mounted across an object OBJ on the annular frame 1202, and X-ray detector rotatably supported around a rotation axis RA. A rotating unit 2107 rotates the annular frame 1202 at a high speed, such as 0.4 sec/rotation, while the object OBJ is being moved along the axis RA into or out of the illustrated page.

The first embodiment of an X-ray computed tomography apparatus according to the present inventions will be described below with reference to the views of the accompanying drawing. Note that X-ray computed tomography apparatuses include various types of apparatuses, e.g., a rotate/rotate-type apparatus in which an X-ray tube and X-ray detector rotate together around an object to be examined, and a stationary/rotate-type apparatus in which many detection elements are arrayed in the form of a ring or plane, and only an X-ray tube rotates around an object to be examined. The present inventions can be applied to either type. In this case, the rotate/rotate type, which is currently the mainstream, will be exemplified.

The multi-slice X-ray CT apparatus further includes a high voltage generator 1209 that generates a tube voltage applied to the X-ray tube 1201 through a slip ring 1208 so that the X-ray tube 1201 generates X-rays. The x-rays are emitted towards the object OBJ, whose cross sectional area is represented by a circle. The X-ray detector 1203 is located at an opposite side from the X-ray tube 1201 across the object OBJ for detecting the emitted X-rays that have transmitted through the object OBJ. The X-ray detector 1203 further includes individual detector elements or units.

The CT apparatus further includes other devices for processing the detected signals from X-ray detector 1203. A data acquisition circuit or a Data Acquisition System (DAS) 1204 converts a signal output from the X-ray detector 1203 for each channel into a voltage signal, amplifies the signal, and further converts the signal into a digital signal. The X-ray detector 1203 and the DAS 1204 are configured to handle a predetermined total number of projections per rotation (TIPPER). Examples of TPPRs include, but are not limited to 900 TPPR, 900-1800 TPPR, and 900-3600 TPPR.

The above-described data is sent to a preprocessing device 1206, which is housed in a console outside the radiography gantry 1200 through a non-contact data transmitter 1205. The preprocessing device 1203 performs certain corrections, such as sensitivity correction on the raw data. A memory 1212 stores the resultant data, which is also called projection data at a stage immediately before reconstruction processing. The memory 1212 is connected to a system controller 1210 through a data control bus 10211, together with a reconstruction device 1214, input device 1215, and display 1216. The system controller 1210 controls a current regulator 1213 that limits the current to a level sufficient for driving the CT system.

The detectors are rotated and/or fixed with respect to the patient among various generations of the CT scanner systems. In one implementation, the above-described CT system can be an example of a combined third-generation geometry and fourth-generation geometry system. In the third-generation system, the X-ray tube 1201 and the X-ray detector 1203 are diametrically mounted on the annular frame 1202 and are rotated around the object OBJ as the annular frame 1202 is rotated about the rotation axis RA. In the fourth-generation geometry system, the detectors are fixedly placed around the patient and an X-ray tube rotates around the patient. In an alternative embodiment, the radiography gantry 1200 has multiple detectors arranged on the annular frame 1201, which is supported by a C-arm and a stand.

In what follows, a detailed description of the embodiments used to reconstruct dynamic images from CT projection data and denoise the dynamic images is provided.

The memory storage device 1212 can store the measurement value representative of the irradiance of the X-rays at the X-ray detector unit 1203. Further, the memory storage device 1212 can store a dedicated program for executing the dynamic image denoising method 100 discussed herein.

The reconstruction device 1214 can execute the CT image reconstruction methods. Further, reconstruction device 1214 can execute pre-reconstruction processing image processing such as volume rendering processing and image difference processing as needed.

The pre-reconstruction processing of the projection data performed by the preprocessing device 1206 can include correcting for detector calibrations, detector nonlinearities, polar effects, noise balancing, and material decomposition.

Post-reconstruction processing performed by the reconstruction device 1214 can include filtering and smoothing the image, volume rendering processing, and image difference processing as needed. Further, the post-reconstruction processing can include the dynamic image denoising method 100 discussed herein. The image reconstruction process can be performed using filtered back projection, iterative image reconstruction methods, or stochastic image reconstruction methods. The reconstruction device 1214 can use the memory storage device 1212 to store, e.g., projection data, reconstructed images, calibration data and parameters, and computer programs.

The reconstruction device 1214 can include a CPU that can be implemented as discrete logic gates, as an Application Specific Integrated Circuit (ASIC), a Field Programmable Gate Array (FPGA) or other Complex Programmable Logic Device (CPLD). An FPGA or CPLD implementation may be coded in VHDL, Verilog, or any other hardware description language and the code may be stored in an electronic memory directly within the FPGA or CPLD, or as a separate electronic memory. Further, the memory 1212 can be non-volatile, such as ROM, EPROM, EEPROM or FLASH memory. The memory 1213 can also be volatile, such as static or dynamic RAM, and a processor, such as a microcontroller or microprocessor, can be provided to manage the electronic memory as well as the interaction between the FPGA or CPLD and the memory.

Alternatively, the CPU in the reconstruction device 1214 can execute a computer program including a set of computer-readable instructions that perform the functions described herein, the program being stored in any of the above-described non-transitory electronic memories and/or a hard disk drive, CD, DVD, FLASH drive or any other known storage media. Further, the computer-readable instructions may be provided as a utility application, background daemon, or component of an operating system, or combination thereof, executing in conjunction with a processor, such as a Xenon processor from Intel of American or an Opteron processor from AMD of America and an operating system, such as Microsoft VISTA, UNIX, Solaris, LINUX, Apple, MAC-OS and other operating systems known to those skilled in the art. Further, CPU can be implemented as multiple processors cooperatively working in parallel to perform the instructions.

In one implementation, the reconstructed images can be displayed on a display 1216. The display 1216 can be an LCD display, CRT display, plasma display, OLED, LED or any other display known in the art.

The memory 1212 can be a hard disk drive, CD-ROM drive, DVD drive, FLASH drive, RAM, ROM or any other electronic storage known in the art.

While certain implementations have been described, these implementations have been presented by way of example only, and are not intended to limit the teachings of this disclosure. Indeed, the novel methods, apparatuses and systems described herein may be embodied in a variety of other forms; furthermore, various omissions, substitutions and changes in the form of the methods, apparatuses and systems described herein may be made without departing from the spirit of this disclosure.

The invention claimed is:

1. An apparatus, comprising:
an interface configured to obtain a plurality of images, each of the plurality of images being reconstructed by performing computed tomography (CT) on data acquired via a CT scan at a respective time interval of a plurality of time intervals; and
processing circuitry configured to
transform the plurality of images into an aggregate image and at least one transform-domain image, each of the at least one transform-domain image comprising at least one difference image between an image of the plurality of images and the aggregate image,
denoise the at least one transform-domain image by
training on pixel arrays of the at least one transform-domain image to generate basis functions of a dictionary, each pixel array including respective pixel values of the at least one transform-domain image, the pixel values of a respective pixel array corresponding to a same pixel location on each image of the at least one transform-domain image, the basis functions of the dictionary being generated to approximate the pixel arrays subject to a sparsity condition, and
approximating each transform-domain image by using one of a matching pursuit method and an orthogonal matching pursuit method to approximate the pixel arrays of the at least one transform-domain image using the dictionary, and
transform the aggregate image and the denoised at least one transform-domain image to generate a plurality of denoised images, each of the plurality of denoised images being a respective image of the plurality of images that has been denoised.

2. The apparatus according to claim 1, wherein the processing circuitry is further configured to transform the plurality of images by
averaging the plurality of images to generate the aggregate image, and
determining each of the at least one transform-domain image using a difference between a respective image of the plurality of images and the aggregate image.

3. The apparatus according to claim 1, wherein the processing circuitry is further configured to transform the plurality of images by
averaging the plurality of images to generate the aggregate image, and
determining each of the at least one transform-domain image using a difference between a respective pair of the plurality of images.

4. The apparatus according to claim 1, wherein the processing circuitry is further configured to transform the plurality of images by
calculating a covariance matrix of the plurality of images;
performing an eigenvalue decomposition of the covariance matrix;
selecting, as basis functions for the transforming of the plurality of images, eigenvectors corresponding to a plurality of largest eigenvalues of the eigenvalue decomposition of the covariance matrix; and
transforming the plurality of images into the aggregate image and the at least one transform-domain image by projecting the plurality of images onto the basis functions.

5. The apparatus according to claim 1, wherein the processing circuitry is further configured to transform the plurality of images by performing a principal component analysis on the plurality of images to generate principal components;

selecting a plurality of largest principal components as basis functions for the transforming of the plurality of images; and transforming the plurality of images into the aggregate image and the at least one transform-domain image by projecting the plurality of images onto the basis functions.

6. The apparatus according to claim 5, wherein the principal component analysis is performed subject to a sparsity constraint constraining at least one of an L1 norm of the principal components and an L0 norm of the principal components.

7. The apparatus according to claim 5, wherein the processing circuitry is further configured to transform the aggregate image and the denoised at least one transform-domain image to generate the plurality of denoised images by combining the aggregate image and the denoised at least one transform-domain image using a linear superposition weighted by respective coefficients of the basis functions to generate a corresponding denoised image of the plurality of denoised images.

8. The apparatus according to claim 1, wherein the processing circuitry is further configured to transform the aggregate image and the denoised at least one transform-domain image by performing an inverse of the transformation on the aggregate image and the denoised at least one transform-domain image, the inverse transformation yielding an identity operator when the inverse transformation is applied to the transformation that transforms the plurality of images into the aggregate image and the at least one transform-domain image.

9. The apparatus according to claim 1, wherein the processing circuitry is further configured to denoise the at least one transform-domain image by generating at least one sparse approximation of the at least one transform-domain image, the at least one sparse approximation being the denoised at least one transform-domain image.

10. The apparatus according to claim 1, wherein the processing circuitry is further configured to denoise the at least one transform-domain image by filtering the at least one transform-domain image using at least one of a low-pass filtering method, an anisotropic diffusion filtering method, a total-variation minimization filtering method, a median filtering method, a nonlinear filtering method, and a non-local means-filtering method.

11. The apparatus according to claim 1, wherein the processing circuitry is further configured to register the plurality of images using at least one of rotations of the plurality of images and translations of the plurality of images.

12. The apparatus according to claim 1, further comprising:

an X-ray source radiating X-rays; and a plurality of detector elements each configured to detect a plurality of energy components of the X-rays that are radiated from the X-ray source and generate projection data, wherein the processing circuitry is further configured to reconstruct the plurality of images from using the projection data by performing computed tomography (CT).

13. A method, comprising:

obtaining a plurality of images, each of the plurality of images being reconstructed by performing computed tomography (CT) on data acquired via a CT scan at a respective time interval of a plurality of time intervals;

transforming the plurality of images into an aggregate image and at least one transform-domain image, each of the at least one transform-domain image comprising at least one difference image between an image of the plurality of images and the aggregate image, denoising the at least one transform-domain image by training on pixel arrays of the at least one transform-domain image to generate basis functions of a dictionary, each pixel array including respective pixel values of the at least one transform-domain image, the pixel values of a respective pixel array corresponding to a same pixel location on each image of the at least one transform-domain image, the basis functions of the dictionary being generated to approximate the pixel arrays subject to a sparsity condition, and approximating each transform-domain image by using one of a matching pursuit method and an orthogonal matching pursuit method to approximate the pixel arrays of the at least one transform-domain image using the dictionary; and transforming the aggregate image and the denoised at least one transform-domain image to generate a plurality of denoised images, each of the plurality of denoised images being a respective image of the plurality of images that has been denoised.

14. The method according to claim 13, further comprising registering the plurality of images using at least one of rotations of the plurality of images and translations of the plurality of images.

15. The method according to claim 13, wherein the transforming of the plurality of images includes performing a principal component analysis on the plurality of images to generate principal components, selecting a plurality of largest principal components as basis functions for the transforming of the plurality of images, and transforming the plurality of images into the aggregate image and the at least one transform-domain image by projecting the plurality of images onto the basis functions.

16. A non-transitory computer readable storage medium including executable instruction, wherein the instructions, when executed by circuitry, cause the circuitry to perform the method according to claim 13.

17. An apparatus, comprising:

an interface configured to obtain a plurality of images, each of the plurality of images being reconstructed by performing computed tomography (CT) on data acquired via a CT scan at a respective time interval of a plurality of time intervals; and processing circuitry configured to transform the plurality of images into an aggregate image and at least one transform-domain image, each of the at least one transform-domain image comprising at least one difference image between an image of the plurality of images and the aggregate image, denoise the at least one transform-domain image by
  partitioning a set of pixel arrays of the at least one transform-domain image into a training set and another set, each pixel array of the set of pixel arrays including respective pixel values of the at least one transform-domain image, the pixel values of a respective pixel array corresponding to a same pixel location on each image of the at least one transform-domain image,
  training basis functions of a dictionary and generating sparse approximations to the training set by using a k-means clustering singular value decomposition (K-SVD) method operating on the training set,
  fixing the basis functions of the dictionary after the training of the basis functions, and
  generating sparse approximations of the respective pixel arrays of the another set using the fixed basis functions of the dictionary, and
transform the aggregate image and the denoised at least one transform-domain image to generate a plurality of denoised images, each of the plurality of denoised images being a respective image of the plurality of images that has been denoised.

18. The apparatus according to claim 17, wherein the processing circuitry is further configured to denoise the at least one transform-domain image by
  generating the sparse approximations of the respective pixel arrays of the another set using the fixed basis functions of the dictionary and using one of a matching pursuit method and an orthogonal matching pursuit method.

19. The apparatus according to claim 17, wherein the processing circuitry is further configured to denoise the at least one transform-domain image by
  downsampling the pixel arrays of the training set before the training of the basis functions of the dictionary, and
  upsampling the trained basis functions of the dictionary before the generating of the sparse approximations of the respective pixel arrays of the another set.

* * * * *